United States Patent [19]

Hideshima et al.

[11] Patent Number: 5,566,277
[45] Date of Patent: Oct. 15, 1996

[54] METHOD AND APPARATUS FOR RECORDING AN IMAGE

[75] Inventors: Takahiro Hideshima; Kenji Yokota, both of Kanagawa, Japan

[73] Assignee: Fuji Photo Film Co., Ltd., Kanagawa, Japan

[21] Appl. No.: 899,445

[22] Filed: Jun. 16, 1992

[30] Foreign Application Priority Data

Jun. 17, 1991 [JP] Japan .................................. 3-144979
Jun. 17, 1991 [JP] Japan .................................. 3-144980
Jun. 17, 1991 [JP] Japan .................................. 3-144981

[51] Int. Cl.$^6$ ................................................ G06K 15/00
[52] U.S. Cl. ............................................................. 395/115
[58] Field of Search ............................ 395/115, 116, 395/164–166, 107; 347/233–245, 247, 132; 358/404, 444

[56] References Cited

U.S. PATENT DOCUMENTS 4,682,190  7/1985  Ikeda ........................................ 346/154
5,021,975  6/1991  Yamanashi ............................... 395/115

FOREIGN PATENT DOCUMENTS 53-9856   4/1978  Japan .
54-5455   1/1979  Japan .
57-41618  3/1982  Japan .
63-5741   2/1988  Japan .

Primary Examiner—Arthur G. Evans
Attorney, Agent, or Firm—Sughrue, Mion, Zinn, Macpeak & Seas

[57] ABSTRACT

A method and apparatus for recording an image by simultaneously recording a plurality of scanning lines by a plurality of laser beams. Image data are written sequentially in units of one scanning line into a plurality of memories. The image data of adjacent scanning lines are read simultaneously in order starting with a memory area corresponding to a leading end of the scanning line toward a memory area corresponding to a terminating end thereof. Laser beams are emitted on the basis of the image data read, so as to record the image. Since the plurality of items of image data are read simultaneously from the plurality of memories, the processing speed can be increased as compared with a case where image data are read sequentially from a memory.

16 Claims, 21 Drawing Sheets

FIG. 6
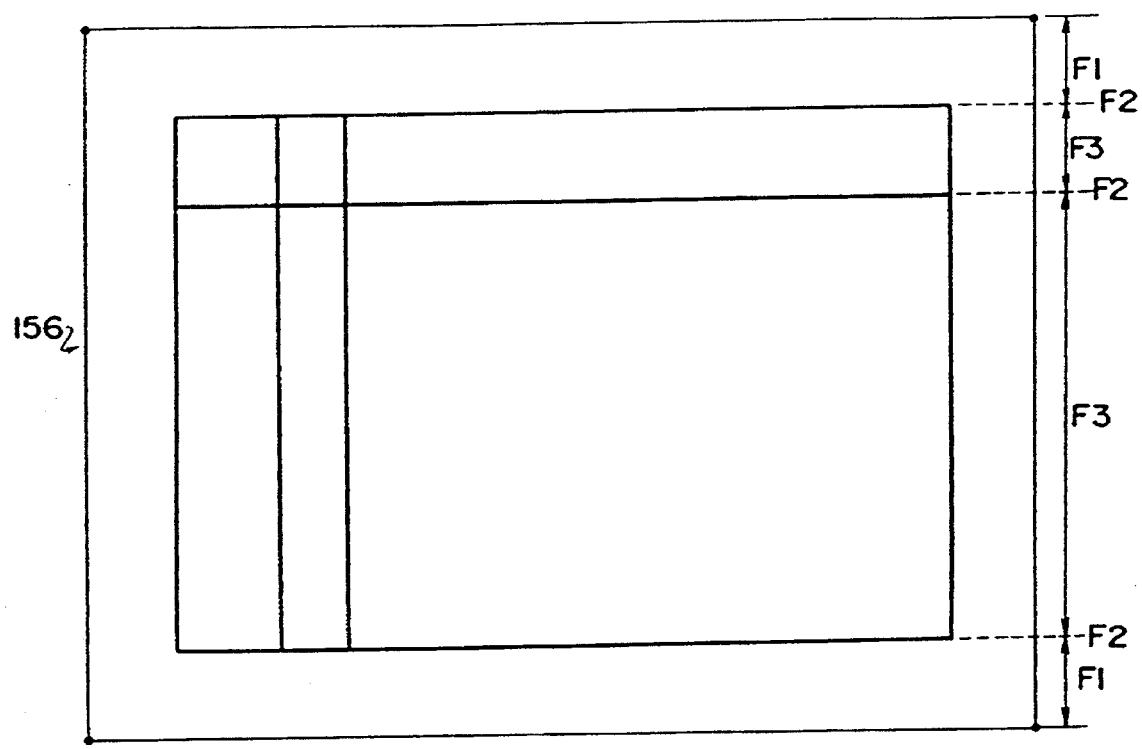
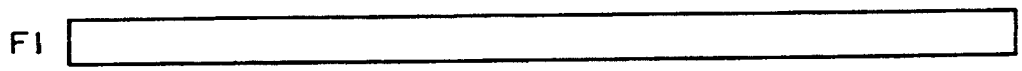

IMAGE DATA

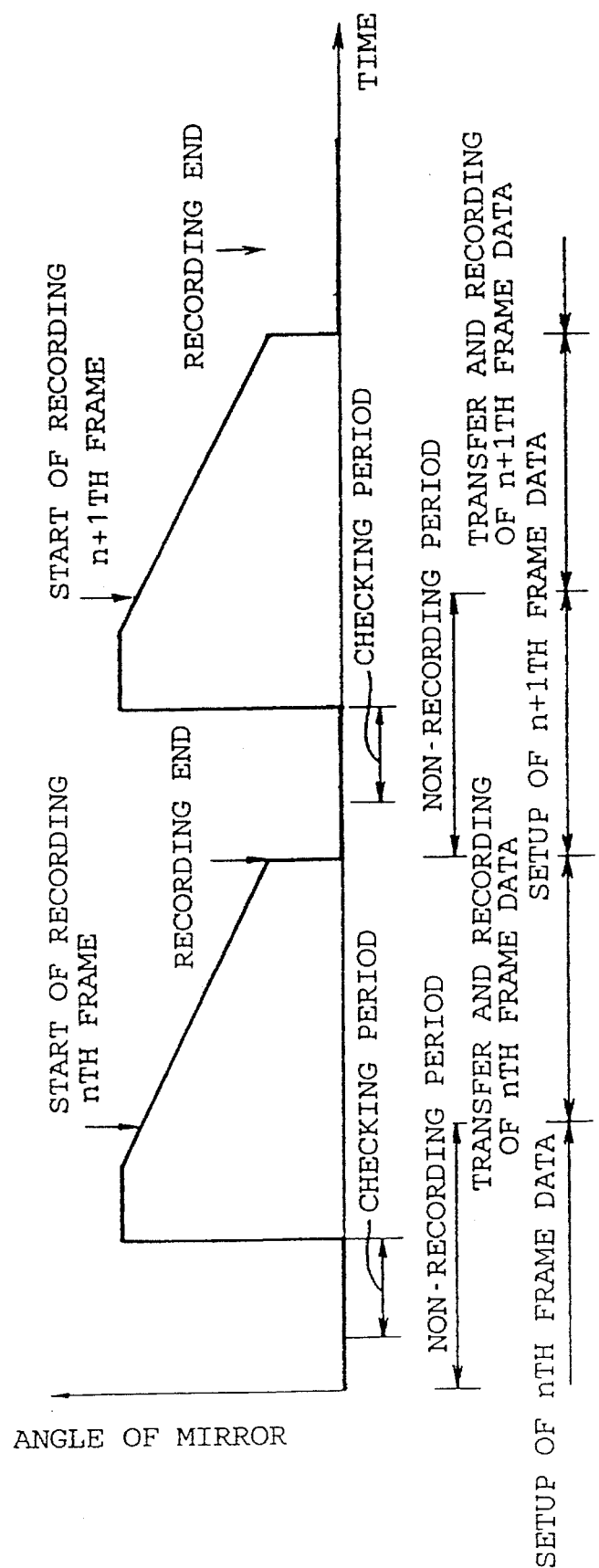

METHOD AND APPARATUS FOR RECORDING AN IMAGE

BACKGROUND OF THE INVENTION

1. Field of the Invention

The present invention relates to a method and an apparatus for recording an image, and more particularly to a method and an apparatus for recording an image wherein image data on an image divided into a plurality of picture elements or pixels are written in a memory, and the image data written therein are read sequentially so as to record the image on the basis of the image data read.

2. Description of the Related Art

Optical beam scanners have hitherto been proposed for effecting reading or recording stably and at high speed by means of a plurality of laser beams by using an optical modulator constituted by a multi-frequency acousto-optic modulator (AOM) (Japanese Patent Application Publication No. 5741/1988, Japanese Patent Application Laid-Open Nos. 5455/1979 and 41618/1982, Japanese Patent Application Publication No. 9856/1978, etc.).

In the optical beam scanner, such as a laser beam recording apparatus, for recording an image by using the AOM, a laser beam made incident in response to an inputted signal is divided into a plurality of laser beams by the AOM, and the plurality of laser beams are simultaneously applied to a photosensitive surface so as to record an image. At that time, plane scanning is effected by performing main scanning as well as sub scanning in a direction perpendicular to that of main scanning, using the laser beams by means of a scanning optical system comprising a rotating polygon mirror, a galvanometer mirror, and the like.

Here, image data representing the presence or absence of a record at each pixel for forming the image is inputted to the AOM, the application of the laser beams is subjected to on-off control on the basis of the image data while the scanning is being effected with the laser beams.

Accordingly, the main scanning of a plurality of lines are effected simultaneously as the plurality of laser beams are reflected by reflecting surfaces of the polygon mirror which rotates at high speed. When this main scanning is effected, the application of the laser beams is subjected to on-off control such that pixels based on the inputted image data will be recorded on a photosensitive material, thereby forming portions of the image corresponding to the main scanning lines along the loci of the laser beams. Upon completion of the main scanning with the laser beams, the laser beams reflected by the polygon mirror are reflected by the galvanometer mirror which is rotated at a predetermined speed, thereby effecting the sub scanning. As a result of this sub scanning, ends of groups of laser beams constituted by the plurality of laser beams are connected together without any gaps, thereby forming the image. It should be noted that there are cases where the main scanning and the sub scanning are effected simultaneously.

For instance, in a case where characters are recorded, the recorded data on the characters are sequentially inputted to the laser beam recording apparatus from an input device of a host computer or the like. The inputted characters are set as font data comprised of a set of pixels corresponding to recording positions, and are sequentially stored in a memory with respect to each inputted character, thereby forming image data corresponding to one recorded image plane. Image data of a predetermined bit length are sequentially read from the memory in which these image data are stored. Then the image data thus read are sent to a recording system, and the application of the laser beams is subjected to on-off control on the basis of the image data read.

However, in the case where the image data are sequentially stored in the memory and the stored image data are read from the memory, as described above, it is necessary to store and read the image data for each predetermined area, i.e., the image data of a predetermined bit length. Therefore, the time duration for writing the image data into the memory and the time duration for reading the same from the memory correspond to the write processing time and the read processing time of the memory, respectively. To reduce these processing times, it is necessary to use a device whose processing speed is fast. In addition, although it is conceivable to reduce the processing time of an essential portion by using a device whose time duration for writing into the memory differs from the time duration for reading from the memory, as required, the arrangement of the apparatus becomes complicated. In this case as well, since the image data for a predetermined area, i.e., the image data of a predetermined bit length, are read, the reduction of the processing time is dependent upon the capacity of the device. Hence, there are naturally limitations to the reduction of the processing speed.

SUMMARY OF THE INVENTION

In view of the above-described circumstances, it is an object of the present invention to provide a method of and an apparatus for recording an image which are capable of improving the processing speed without using a special device in the writing or reading of data with respect to a memory for storing image data, thereby overcoming the above-described drawbacks of the conventional art.

To this end, in accordance with the present invention, there is provided a method of recording an image by simultaneously recording a plurality of scanning lines means of a plurality of laser beams, comprising the steps of: sequentially writing image data in units of one scanning line into a plurality of memories; reading from the plurality of memories the image data of the plurality of scanning lines to be placed adjacent each other at the time of recording, in order starting with a memory area corresponding to a leading end of each of the scanning lines toward a memory area corresponding to a end thereof; and emitting the laser beams on the basis of the image data which have been read so as to record the image.

In addition, in accordance with the present invention, there is provided an image recording apparatus comprising: a plurality of memories having address terminals connected in common, read enable terminals connected in common, and write enable terminals provided independently, the plurality of memories being each adapted to store image data in units of one scanning line; writing means for writing the image data sequentially into the plurality of memories in units of one scanning line by inputting a write control signal sequentially to the write enable terminals and by designating addresses sequentially; reading means for simultaneously reading from the plurality of memories the image data of a plurality of scanning lines to be placed adjacent each other at the time of recording, in order starting with a memory area corresponding to a leading end of each of the scanning lines toward a memory area corresponding to a terminating end thereof, by inputting a read control signal to the read enable terminals and by designating the addresses sequentially; and recording means for recording an image by emitting a plurality of laser beams on the basis of the image data which have been read from the plurality of memories.

In the present invention, an image is recorded by simultaneously recording a plurality of scanning lines by means of a plurality of laser beams. At that time, all the image data are recorded in all the plurality of memories by sequentially writing the image data in units of one scanning line into the plurality of memories. Then, a process is repeated in which the image data of the plurality of scanning lines to be placed adjacent each other at the time of recording are read simultaneously from the plurality of memories, starting with a memory area corresponding to a leading end of each of the scanning lines toward a memory area corresponding to a terminating end thereof in the plurality of memories. The laser beams are emitted on the basis of the image data which have been read simultaneously, so as to record the image. Thus, since the image is recorded by simultaneously reading the plurality of items of image data, it is possible to reduce the time required for read processing for reading the image data at the time when the plurality of scanning lines are simultaneously recorded by a plurality of laser beams.

In a case where two memories are used as the plurality of memories, the image data on the image to be recorded are written alternately into the two memories in units of one scanning line, and all the image data on the image are stored in the two memories. Then, the process of simultaneously reading from the two memories the image data of two scanning lines to be placed adjacent each other at the time of recording is performed consecutively. The image data thus read are stored in units of a number identical to the number of the laser beams to be emitted. The laser beams are emitted on the basis of the image data thus stored, thereby recording the image. Thus, since all the image data are stored into two memories, and are read simultaneously from the two memories, it suffices to provide the wiring of only two memories without providing complicated wiring by preparing a multiplicity of memories. In addition, in a case where the plurality of scanning lines are simultaneously recorded by a plurality of laser beams, since the image data are stored in units of a number identical to the number of the laser beams to be emitted, it is possible to effect recording simultaneously by the plurality of laser beams.

The image recording apparatus in accordance with the present invention has a plurality of memories. These memories have address terminals connected in common and read enable terminals connected in common, as well as write enable terminals which are provided independently. Here, the writing means writes the image data sequentially into the plurality of memories in units of one scanning line by inputting a write control signal sequentially to the independent write enable terminals and by designating addresses sequentially to the memory to which the write control signal has been inputted. Thus, the image data are recorded in each of the memories in units of one scanning line. Then, as for the image data written into the memories, the image data of the plurality of scanning lines to be placed adjacent each other at the time of recording are simultaneously read by the reading means in order starting with a memory area corresponding to a leading end of each of the scanning lines toward a memory area corresponding to a terminating end thereof, by inputting the read control signal to the read enable terminals and by designating the addresses sequentially. The recording means records the image by emitting the laser beams on the basis of the image data which have been read from the plurality of memories. Thus, since the image is recorded by the recording means on the basis of the plurality of items of image data which have been simultaneously read by the reading means, it is possible to reduce the time required for read processing for reading the image data when the image is recorded simultaneously using a plurality of scanning lines by means of a plurality of laser beams.

In the case where two memories are used as the plurality of memories, the writing means writes the image data alternatively into the two memories in units of one scanning line by outputting the write control signal alternately to the independent write enable terminals and by designating addresses sequentially. As a result, the image data are recorded in units of one scanning line into each of the memories. Then, as for the image data written into the memories, the reading means simultaneously reads from the two memories the image data of two scanning lines to be placed adjacent each other at the time of recording, in order starting with the memory area corresponding to the leading end of each of the scanning lines toward the memory area corresponding to the terminating end thereof, by outputting the read control signal to the read enable terminals and by designating addresses sequentially. The image data which have been read by the reading means are stored by the storage means in data units of a number identical to the number of the laser beams to be emitted. Thus, since all the image data are stored into the two memories, and are read simultaneously from the two memories by the reading means, it is possible to reduce the time required for read processing for reading the image data. Furthermore, it becomes unnecessary to provide complicated wiring by preparing a multiplicity of memories and it suffices to provide the wiring of only two memories. In addition, in a case where the image is recorded simultaneously by using the plurality of scanning lines by means of the plurality of laser beams, since the image data are stored by the storage means in data units of a number identical to the number of the laser beams to be emitted, it is possible to effect recording simultaneously by the plurality of laser beams.

As described above, in accordance with the present invention, since the plurality of items of image data are read simultaneously from the plurality of memories, the processing speed can be increased as compared with a case where image data are read sequentially from a memory.

In the present invention, for instance, in a case where characters are recorded, the recorded data on the characters are sequentially inputted from an input device of a host computer or the like. The inputted characters are set as font data comprised of a set of pixels corresponding to recording positions, and are sequentially stored in the memories with respect to each inputted character, thereby forming image data corresponding to one recorded image plane. The image data stored in the memories are sequentially transmitted to a recording system, and recording is effected by the laser beams.

Here, in a case where ruled lines are recorded together with the characters at the time of preparation of a table or the like, ruled-line data and font data are prepared. Then, to record the font data simultaneously with the rule lines, the ruled-line data and the font data both corresponding to each pixel are read simultaneously, and are stored into the memory as image data. Subsequently, it is necessary to send the respective items of the stored image data sequentially to the recording system and to subject the application of the laser beams to on-off control on the basis of the image data.

However, with the method for obtaining image data by reading both the ruled-line data and the font data as the image data, i.e., as the recorded data, as described above, it is necessary to store new image data in the memory in an ensuing image-recording cycle. Hence, it is necessary to delete, i.e., clear, the stored ruled-line data and font data each time the recording is completed, so that the image data will not remain in the memory. In addition, it is conceivable to effect recording by changing only the font data in a case where the type of ruled line is the same. In this case, for instance, a glass sheet on which ruled lines are recorded is prepared as a hard form, and both the ruled lines and the font data are written simultaneously by allowing light to be transmitted through the glass sheet. Therefore, it is necessary to insert the glass sheet with the ruled lines recorded thereon into an exposing section, so that the apparatus becomes mechanically complicated. In addition, it is necessary to prepare glass sheets corresponding to the types of ruled lines. Furthermore, in this case as well, since it is necessary to store new image data in the memory at the time of an ensuing image recording, the stored font data must be deleted each time the recording is completed, so that the image data will not remain in the memory.

To overcome the above-described problems, in the present invention, when ruled-line data and character data are written in combined form into the memories for storing the image data, the ruled-line data is written in a memory area corresponding to a ruled-line portion of the image, while blank data is written in a memory area corresponding to a portion of the image other than the ruled-line portion, so as to initialize the contents of the memories.

In addition, the ruled-line data is written in the memory area corresponding to the ruled-line portion of the image, while blank data is written in the memory area corresponding to the portion of the image other than the ruled-line portion, so as to initialize the contents of the memories. When the character data is written, data stored in a portion of each of the initialized memories where the character data are written are read. If the data thus read is one of the ruled-line data and the character data, that one of the ruled-line data and the character data is prevented from being changed. Meanwhile, if the read data is the blank data, the character data is stored in each of the memories by writing in the portion a content corresponding to the character data to be written.

If the above-described arrangement is adopted, by writing the ruled-line data in the memory area corresponding to the ruled-line portion of the image, and by writing the blank data in the memory area corresponding to the portion of the image other than the ruled-line portion, the contents of the memories are initialized. Since the contents of the memories are initialized by writing the ruled lines into the memories, there is no need to add the process of deleting the contents of the memories before storing new data, so that it is possible to reduce the number of processes for initializing the contents of the memories.

When the character data is written, the data stored in the portion of each of the initialized memories where the character data is written is read. If the data thus read is one of the ruled-line data and the character data, that one of the ruled-line data and the character data is prevented from being changed. Meanwhile, if the data read is the blank data, the character data is stored in each of the memories by writing in the portion a content corresponding to the character data to be written, so as to store the character data into the memories. Thus, when the character data is written into the memories, the stored data is read, and only when the data thus read is blank data, the content corresponding to the character data to be written is written in that portion. For this reason, even in a case where a plurality of items of character data are written into memories, by writing the character data, it is possible to continuously write the character data without changing the stored data. Accordingly, each time the ruled lines are written into the memories, the contents of the memories are initialized, and the character data is written into blank portions of the memories. Hence, it is possible to eliminate the process of deleting the contents of the memories each time new image data is stored, thereby making it possible to reduce the number of processes.

As described above, if the contents of the memories are initialized by writing the ruled lines and writing blank data into the memories, there is no need to add the process of deleting the contents of the memories on the occasion of each recording, so that the image data can be processed by a simple process.

Furthermore, in a case where an image is recorded on a recording material whose width is as large as one image plane portion of the image, recording is in some cases effected by rotating the direction of the image to be formed on the recording material by 90°. Conventionally, the image is rotated by providing an exposing optical system with a member for rotating the image, such as a prism, so as to effect recording. Alternatively, the image data is converted to one in which the image is rotated, and the rotated image data is written into memories, and the image data are read sequentially to effect recording.

However, in the case where the member for rotating the image is used in the exposing optical system, different exposing optical systems must be adopted for the case where the image is rotated and for the case where it is not. For this reason, since a mechanism for effecting a change in the member and a process are added, the apparatus becomes complicated, and the number of processes increases. In addition, although it is conceivable to provide rotation processing in the processing system for the image data, since the image data are read sequentially from the memories, it is necessary to convert the image data into one in which the image is rotated, before the image data are written into the memories. Hence, the processing becomes complicated, and higher processing speed is required.

Accordingly, in the present invention, when recording is effected such that a vertical direction of the image and a transverse direction of a recording material become parallel with each other, the image is recorded by repeating a process in which the image data are read and recorded sequentially in units of a number identical to the number of the laser beams to be emitted, starting with the memory area corresponding to the leading end of each of the adjacent scanning lines whose number is identical to the number of the laser beams to be emitted, toward the memory area corresponding to the terminating end of that scanning line. Meanwhile, when recording is effected such that the vertical direction of the image and the transverse direction of a recording material become perpendicular to each other, the image is recorded by repeating a process in which the image data are read and recorded sequentially in units of a number identical to the number of the laser beams to be emitted, starting with a leading one of the scanning lines toward a terminating one thereof and starting with the terminating end of the scanning line toward the leading end thereof with respect to the respective scanning lines.

Furthermore, when recording is effected such that the vertical direction of the image and the transverse direction of the recording material become parallel with each other, the image is recorded by repeating a process in which the image data are read and recorded simultaneously in units of a number identical to the number of the laser beams to be emitted sequentially, starting with the memory area corresponding to the leading end of each of the adjacent scanning lines whose number is identical to the number of the laser beams to be emitted, toward the memory area corresponding to the terminating end of that scanning line. Meanwhile, when recording is effected such that the vertical direction of the image and the transverse direction of a recording material become perpendicular to each other, the image is recorded by repeating a process in which the image data are read sequentially from a corresponding one of the memories in data units of a number identical to the number of the laser beams to be emitted, starting with the leading one of the scanning lines toward the terminating one thereof and starting with the terminating end of the scanning line toward the leading end thereof with respect to the respective scanning lines, so as to effect recording.

Moreover, when two memories are used as the plurality of memories, the following procedure is taken: When recording is effected such that the vertical direction of the image and the transverse direction of the recording material become parallel with each other, the image is recorded by repeating a process in which the image data of two adjacent scanning lines are read simultaneously, in order starting with the memory area corresponding to the leading end of each of the scanning lines toward the memory area corresponding to the terminating end of that scanning line, and the image data which have been read are stored and recorded in units of a number identical to the number of the laser beams to be emitted. Meanwhile, when recording is effected such that the vertical direction of the image and the transverse direction of the recording material become perpendicular to each other, the image is recorded by repeating a process in which the image data are read from a corresponding one of the memories in data units of a number identical to the number of the laser beams to be emitted, starting with the leading one of the scanning lines toward the terminating one thereof and starting with the terminating end of the scanning line toward the leading end thereof with respect to the respective scanning lines, so as to effect recording.

As described above, when the image is recorded by sequentially writing the image data in units of one scanning line into the memories and by reading the image data written into the memories, and when recording is effected such that a vertical direction of the image and a transverse direction of a recording material become parallel with each other, the image is recorded as follows: the image data are read in units of a number identical to the number of the laser beams to be emitted, from the memory area corresponding to the leading end of each of the adjacent scanning lines whose number is identical to the number of the laser beams to be emitted, and the image data thus read are recorded. Then, a process is repeated in which the image data are read sequentially in units of a number identical to the number of the laser beams to be emitted, starting with the memory area corresponding to the leading end of the adjacent scanning line toward the memory area corresponding to the terminating end of that scanning line. Thus, the image data in the vertical direction of the image are read sequentially in units of a number identical to the number of the laser beams to be emitted. On the basis of the image data thus read, the plurality of scanning lines are recorded simultaneously in the direction perpendicular to the transverse direction of the recording material by means of the plurality of laser beams, so as to record the image onto the recording material. Hence, the image is recorded in such a manner that the vertical direction of the image and the transverse direction of the recording material become parallel with each other.

Meanwhile, when recording is effected such that the vertical direction of the image and the transverse direction of a recording material become perpendicular to each other, the image is recorded as follows: the image data are read in units of a number identical to the number of the laser beams to be emitted, starting with the leading one of the scanning lines toward the terminating one thereof and starting with the terminating end of the scanning line toward the leading end thereof with respect to the respective scanning lines, and the image data thus read are recorded. Then, a process is repeated in which the image data are read in units of a number identical to the number of the laser beams to be emitted, starting with the leading one of the scanning lines toward the terminating one thereof and starting with the terminating end of the scanning line toward the leading end thereof with respect to the respective scanning lines. Thus, the image data in the horizontal direction of the image are read sequentially in units of a number identical to the number of the laser beams to be emitted. On the basis of the image data thus read, the plurality of scanning lines are recorded simultaneously in the direction perpendicular to the transverse direction of the recording material by means of the plurality of laser beams, so as to record the image onto the recording material. Hence, the image is recorded in such a manner that the vertical direction of the image and the transverse direction of the recording material become perpendicular to each other.

Thus, by effecting recording by reading the image data in units of a number identical to the number of laser beams to be emitted, from the memories into which the image data have been written, and in correspondence with the direction of the recorded image, it is possible to record the image in which the vertical direction of the image and the transverse direction of the recording material are either parallel with or perpendicular to each other.

In addition, when the image data which have been written into the plurality of memories are read to record the image onto the recording material, and when recording is effected such that the vertical direction of the image and the transverse direction of the recording material become parallel with each other, the image is recorded as follows: the image data are read simultaneously in units of a number identical to the number of the laser beams to be emitted, from a memory area of each memory corresponding to the leading end of each of the adjacent scanning lines whose number is identical to the number of the laser beams to be emitted, and the image data thus read are recorded. Then, a process is repeated in which the image data are read simultaneously and sequentially in units of a number identical to the number of the laser beams, starting with the memory area corresponding to the leading end of the scanning line toward the memory area corresponding to the terminating end of that scanning line. Thus, the image data in the vertical direction of the image are read simultaneously and sequentially in units of a number identical to the number of the laser beams to be emitted. On the basis of the image data thus read, the plurality of scanning lines are recorded simultaneously in the direction perpendicular to the transverse direction of the recording material by means of the plurality of laser beams, so as to record the image onto the recording material. Hence, the image is recorded in such a manner that the vertical direction of the image and the transverse direction of the recording material become parallel with each other.

On the other hand, when recording is effected such that the vertical direction of the image and the transverse direction of a recording material become perpendicular to each other, the image is recorded as follows: the image data are read sequentially in units of a number identical to the number of the laser beams to be emitted, starting with the leading one of the scanning lines toward the terminating one thereof and starting with the terminating end of the scanning line toward the leading end thereof in one of the plurality of memories corresponding to each scanning line. Then, a process is repeated in which the image data are read in units of a number identical to the number of the laser beams to be emitted, starting with the leading one of the scanning lines toward the terminating one thereof and starting with the terminating end of the scanning line toward the leading end thereof with respect to the respective scanning lines. Thus, the image data in the horizontal direction of the image are read sequentially in units of a number identical to the number of the laser beams to be emitted. On the basis of the image data thus read, the plurality of scanning lines are recorded simultaneously in the direction perpendicular to the transverse direction of the recording material by means of the plurality of laser beams, so as to record the image onto the recording material. Thus, the image is recorded in such a manner that the vertical direction of the image and the transverse direction of the recording material become perpendicular to each other.

Thus, by effecting recording by sequentially reading the image data in units of a number identical to the number of laser beams to be emitted, from each of the memories and in correspondence with the direction of the recorded image, it is possible to record the image in which the vertical direction of the image and the transverse direction of the recording material are either parallel with or perpendicular to each other.

In addition, in the case where two memories are used as the plurality of memories, and when the image data which have been written into these two memories are read to record the image onto the recording material, and when recording is effected such that a vertical direction of the image and a transverse direction of a recording material become parallel with each other, the image is recorded as follows: the image data of two adjacent scanning lines are read simultaneously from the memory area corresponding to the leading end of the scanning line. Then, the image data are sequentially stored in units of a number identical to the number of the laser beams to be emitted with respect to the adjacent scanning lines. The image is recorded on the basis of the image data thus stored. Then, the above-described procedure is repeated starting with the memory area corresponding to the leading end of the scanning line toward the memory area corresponding to the terminating end of that scanning line. Thus, the image data in the vertical direction of the image are read and stored sequentially in units of a number identical to the number of the laser beams to be emitted. On the basis of the image data thus stored, the plurality of scanning lines are recorded simultaneously in the direction perpendicular to the transverse direction of the recording material by means of the plurality of laser beams, so as to record the image onto the recording material. Hence, the image is recorded in such a manner that the vertical direction of the image and the transverse direction of the recording material become parallel with each other.

On the other hand, when recording is effected such that the vertical direction of the image and the transverse direction of a recording material become perpendicular to each other, the image is recorded as follows: the image data are read from a corresponding one of the memories in data units of a number identical to the number of the laser beams to be emitted, starting with the leading one of the scanning lines toward the terminating one thereof and starting with the terminating end of the scanning line toward the leading end thereof with respect to the respective scanning lines, so as to effect recording. The recording of the image data thus read is repeated starting with the terminating end of the scanning line toward the leading end thereof. Thus, the image data in the horizontal direction of the image are read sequentially in units of a number identical to the number of the laser beams to be emitted. On the basis of the image data thus read, the plurality of scanning lines are recorded simultaneously in the direction perpendicular to the transverse direction of the recording material by means of the plurality of laser beams, so as to record the image onto the recording material. Hence, the image is recorded in such a manner that the vertical direction of the image and the transverse direction of the recording material become perpendicular to each other.

Thus, as the image data are sequentially read from the two memories in the order corresponding to the direction of the recorded image, and the image data are stored and recorded in units of a number identical to the number of the laser beams to be emitted, it is possible to record the image in which the vertical direction of the image and the transverse direction of the recording material are either parallel with or perpendicular to each other.

In the image recording apparatus having the plurality of memories in accordance with the present invention, the reading means repeats a process of simultaneously reading the image data of the plurality of adjacent scanning lines, in order starting with the memory area corresponding to the leading end of each of the scanning lines toward the memory area corresponding to the terminating end thereof, by outputting the read control signal in common to the read enable terminals and by designating addresses sequentially. The reading means repeats a process in which the image data are read sequentially in units of a number identical to the number of the laser beams to be emitted, starting with a leading one of the scanning lines toward a terminating one thereof and starting with the terminating end of the scanning line toward the leading end thereof with respect to the respective scanning lines, by outputting the read control signal sequentially to the read enable terminals and by designating an address whose value is subtracted sequentially from a value of an address of the memory area corresponding to the terminating end of the scanning line, to the memory to which the read control signal has been inputted. Then, the recording means causes the laser beams to be emitted on the basis of either one of the image data which have been read by the reading means, so as to record the image. Thus, by simultaneously reading the image data in units of a number identical to the number of laser beams to be emitted, from the plurality of memories and in correspondence with the direction of the recorded image, it is possible to record the image in which the vertical direction of the image and the transverse direction of the recording material are either parallel with or perpendicular to each other.

In the image recording apparatus having two memories in accordance with the present invention, the reading means repeats a process of simultaneously reading the image data of two adjacent scanning lines in order starting with the memory area corresponding to the leading end of each of the scanning lines toward the memory area corresponding to the terminating end thereof, by outputting the read control signal to the read enable terminals and by designating addresses sequentially. The reading means repeats a process in which the image data are read in units of a number identical to the number of the laser beams to be emitted, starting with a leading one of the scanning lines toward a terminating one thereof and starting with the terminating end of the scanning line toward the leading end thereof with respect to the respective scanning lines, by outputting the read control signal to the read enable terminals and by designating an address whose value is subtracted sequentially from a value of an address of the memory area corresponding to the terminating end of the scanning line. Then, the storages means stores either one of the image data which have been read by the reading means, in units of a number identical to the number of the laser beams to be emitted. Thus, by by reading the image data in units of a number identical to the number of laser beams to be emitted, from the two memories and in correspondence with the direction of the recorded image, it is possible to record the image in which the vertical direction of the image and the transverse direction of the recording material are either parallel with or perpendicular to each other.

As has been described above, if the image data are recorded by being sequentially read from the memories into which the image data have been written, in units of a number identical to the number of the laser beams to be applied and in correspondence with the direction of the recorded image, it is possible to record the image in a desired direction of the image without making the apparatus complex.

If the image data are recorded by being read from each of the plurality of memories simultaneously in data units of a number identical to the number of the laser beams to be emitted, and in an order corresponding to the direction of the recorded image, it becomes possible to record the image in the desired direction of the image by reading the contents of the memories without making the apparatus complex and without an increase in the read processing time by simultaneously reading the image data.

If the image data are read sequentially from two memories in an order corresponding to the direction of the recorded image, and the image data are stored and recorded in units of a number identical to the number of the laser beams to be emitted, it becomes possible to record the image in the desired direction of the image by reading the contents of the memories without making the apparatus complex and without effecting the complicated wiring resulting from a multiplicity of memories.

If the image data are read simultaneously from the plurality of memories in data units of a number identical to the number of the laser beams to be applied, in correspondence with the direction of the recorded image, the arrangement of the apparatus can be simplified and the processing speed can be increased as compared with an apparatus which rotates the image by an optical system or an apparatus in which rotation processing is performed by a data processing system.

If the image data corresponding to the number of the laser beams to be emitted are read simultaneously from two memories in correspondence with the direction of the recorded image, the arrangement of the apparatus can be simplified and the processing speed can be increased as compared with an apparatus which rotates the image by an optical system or an apparatus in which rotation processing is performed by a data processing system.

The other objects, features and advantages of the present invention will become more apparent from the following detailed description of the invention when read in conjunction with the accompanying drawings.

BRIEF DESCRIPTION OF THE DRAWINGS

FIG. 6 is a diagram illustrating a ruled-line pattern and ruled-line data of a soft form memory for forming the ruled-line pattern;

FIG. 21 is a diagram illustrating the relationship among a data checking period, a data non-recording period, and a data recording period with respect to the angle of a galvanometer mirror used in the laser recording section.

DETAILED DESCRIPTION OF THE PREFERRED EMBODIMENT

Figure 1:
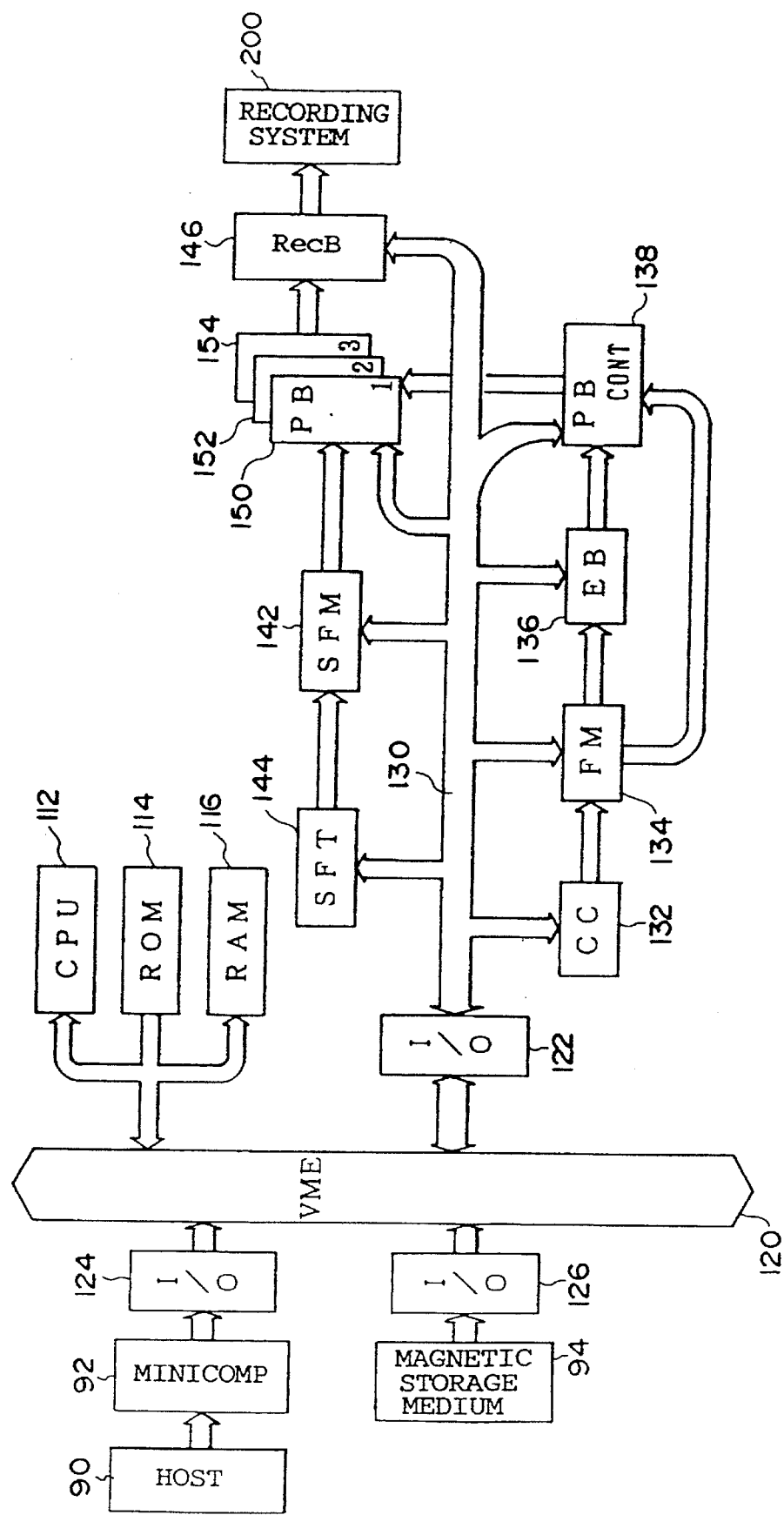
FIG. 1 is a block diagram illustrating a control unit of a font display section of a laser beam recording apparatus in accordance with an embodiment of the present invention.

Referring now to the drawings, a detailed description will be given of the embodiment of the present invention. In this embodiment, the present invention is applied to a laser beam recording apparatus as an optical beam scanner.

Figure 2:
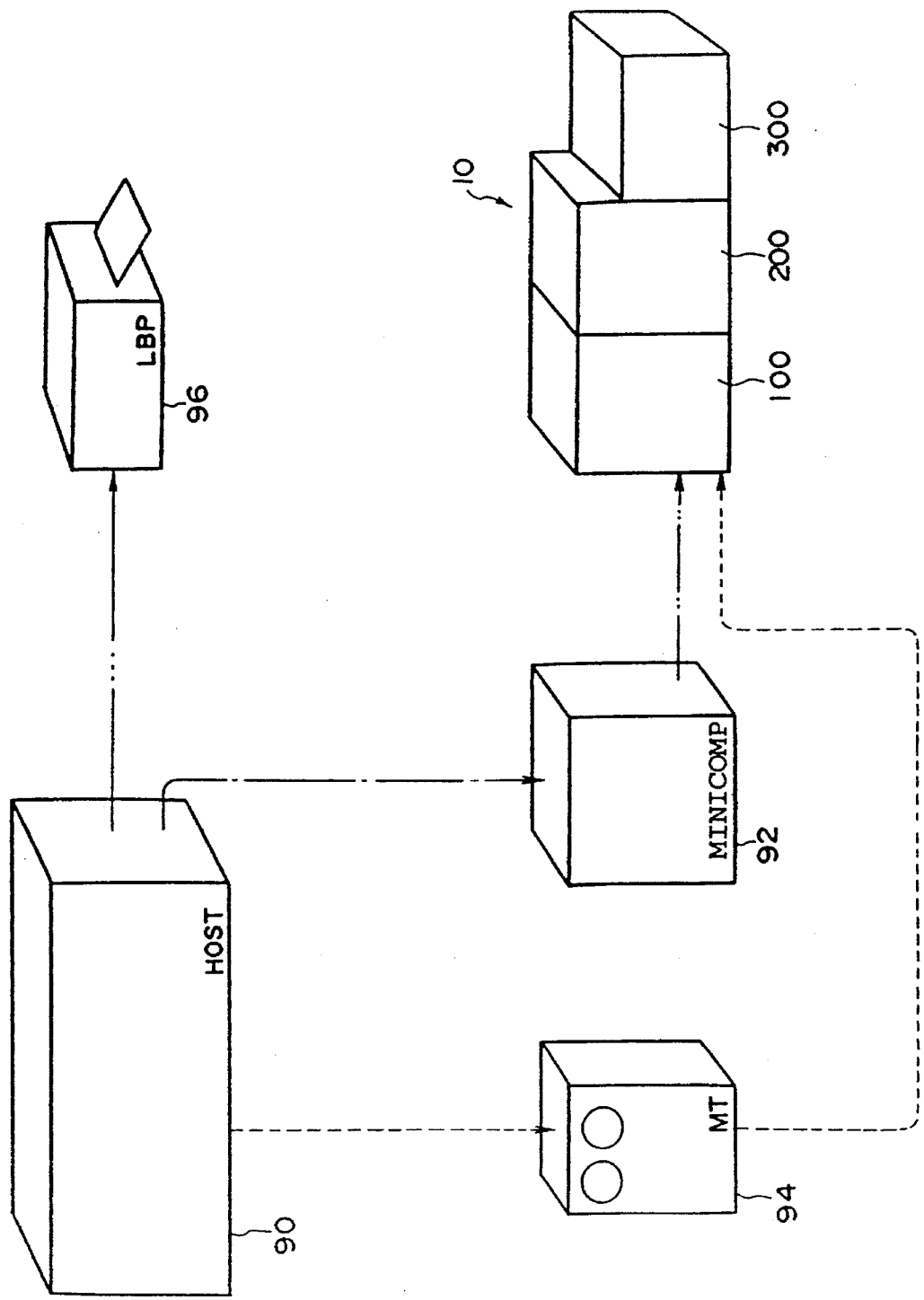
FIG. 2 is a diagram illustrating an example of the relationship of connection between the laser beam recording apparatus and a host computer which stores character data and the like to be recorded.

FIG. 2 shows an example of connection between a laser beam recording apparatus 10 and a host computer 90 in a case where characters and the like are recorded on a photosensitive material by means of the laser beam recording apparatus 10 on the basis of character codes outputted from the host computer 90 which stores recorded data such as characters. The host computer 90 is connected to the laser beam recording apparatus 10 via a minicomputer 92, and the character codes outputted from the host computer 90 are sequentially inputted to the laser beam recording apparatus 10. Meanwhile, a magnetic storage medium 94 such as a magnetic tape is used for recording control words for the character codes and the like, and the laser beam recording apparatus 10 is adapted to read the codes of the magnetic storage medium 94. As a result, the laser beam recording apparatus 10 records the characters and the like on the photosensitive material in correspondence with the character codes outputted from the host computer 90. A printer 96, such as a laser printer, for printing the stored contents is connected to the host computer 90.

As shown in FIG. 2, the laser beam recording apparatus 10 in accordance with the embodiment of the present invention comprises a font display section 100, a laser recording section 200, and a development processing section 300 which are respectively arranged independently. These sections are respectively provided with control units. Character codes are inputted to the font display section 100 from the host computer 90 via the minicomputer 92. In the font display section 100, the characters of the character codes are converted to image data on an image to be recorded on the basis of the inputted character codes. The transmission and reception of image data and control signals are effected between the font display section 100 and the laser recording section 200. In the laser recording section 200, laser beams are applied to the photosensitive material to form on the photosensitive material an image such as characters of the character codes inputted to the font display section 100. Upon completion of the recording of the image on the photosensitive material, the photosensitive material is transported to the development processing section 300. In the development processing section 300, development processing and the like are effected, allowing the image to be formed on the photosensitive material.

First, a detailed description will be given of the font display section 100.

As shown in FIG. 1, the control unit of the font display section 100 has a Versa Module Europe (VME) data bus line 120 for handling inputs and outputs of data and commands between other devices themselves. Connected to this VME data bus line 120 is a microcomputer which comprises a central processing unit (CPU) 112, a read-only memory (ROM) 114, a random-access memory (RAM) 116, and the like. This ROM 114 stores a control program for controlling the font display section 100.

In addition, input/output (I/O) drivers 122, 124, and 126 are also connected to the VME data bus line 120. These I/O drivers serve to make mutually compatible the input/output signals of the other devices and the signals of the VME data bus line 120. The I/O drivers are arranged such that signals can be inputted to or outputted from the VME data bus line 120 in accordance with the specifications of the respective devices.

The host computer 90 is connected to the I/O driver 124 via the minicomputer 92, and character codes serving as recorded data and outputted from the host computer 90 are inputted to the I/O driver 124. The magnetic storage medium 94 is connected to the I/O driver 126 such that the signal from the magnetic storage medium 94 in which the user codes are recorded can be inputted to the I/O driver 126. The arrangement provided is such that even if character codes are inputted from various computers by different character code systems, the same character fonts can be recorded at the time of recording. These user codes include JIS (Japanese Industrial Standards) codes, shift JIS codes, and the like. It should be noted that, in this embodiment, character codes inputted through a code converter (CC), which will be described later, are converted to internal character codes for the laser beam recording apparatus 10.

A sub-bus line 130 is connected to the I/O driver 122. Connected to this sub-bus line 130 are a code converter (CC) 132, a font memory (FM) 134, an effect buffer (EF) 136, a page buffer control (PBCont) 138, page buffers (PBs) 150, 152, and 154, a soft form memory (SFM) 142, a soft form table (SFT) 144, and a recording buffer (RecB) 146.

The font memory 134 is connected to the code converter 132. The code converter 132 converts the inputted character codes to the internal codes for the laser beam recording apparatus 10, and outputs a control signal to the font memory 134, requesting the font memory 134 to designate a character font. The effect buffer 136 and the page buffer control 138 are connected to the font memory 134. The font memory 134 reads a character font corresponding to the inputted internal code and outputs the character font to the effect buffer 136, and at the same time outputs to the page buffer control 138 offset data which indicates a recording position on the image. When the character is to be recorded by being rotated, enlarged, or reduced, the effect buffer 136 performs the conversion of the character font, such as the rotation, enlargement, or reduction, and outputs the converted character font. Meanwhile, when an ordinary character is to be outputted, the effect buffer 136 allows the character font to pass therethrough without being converted. This effect buffer 136 is connected to the page buffer control 138 such that the passed or converted font data is inputted to the page buffer control 138. The page buffers 150, 152, and 154 are connected to the page buffer control 138, and font data is outputted to a predetermined address of a predetermined page buffer to write image data in that page buffer.

Figure 3:
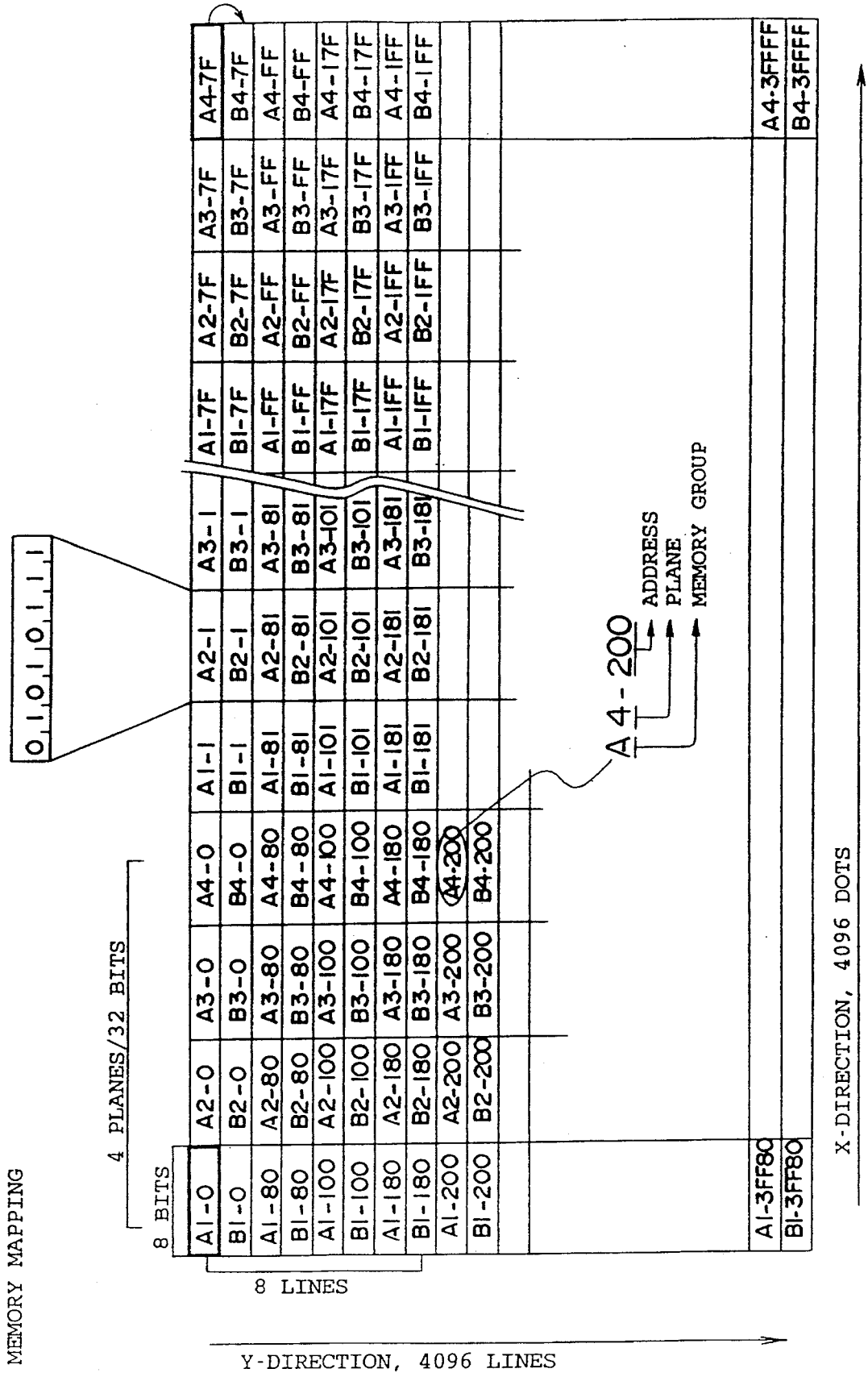
FIG. 3 is a diagram illustrating the memory mapping of a page buffer.

As shown in FIG. 3, one pixel corresponds to one bit in the memories of the page buffers 150, 152, and 154. An image is formed as these pixels are arranged in a two-dimensional format. Accordingly, the memories of the page buffers 150, 152, and 154 store an image by storing image data on the respective pixels of the image. Namely, image data comprised of 4096 dots in the horizontal (X) direction and 4096 scanning lines in the vertical (Y) direction are divided into units of 32 bits. Addresses are obtained in correspondence with respective areas by setting the address of an upper left area in FIG. 3 as 0. In this embodiment, the memories of the page buffer 150, i.e., the memories for storing image data on one image comprised of 4096 dots in the horizontal (X) direction and 4096 scanning lines in the vertical (Y) direction, are constituted by two memory groups, a memory group 150A and a memory group 150B. At this time, the image data on pixels in the X-direction are stored in the same memory group 150A or 150B, and the image data are stored alternately in the memory group 150A and the memory group 150B for each scanning line in the Y-direction. Accordingly, as will be described below, by designating an identical address, it is possible to perform the reading and writing of image data of 64 bits (32×2 bits) by means of the memory groups 150A and 150B. In addition, the page buffers 152 and 154 are also configured in the same manner.

Figure 4:
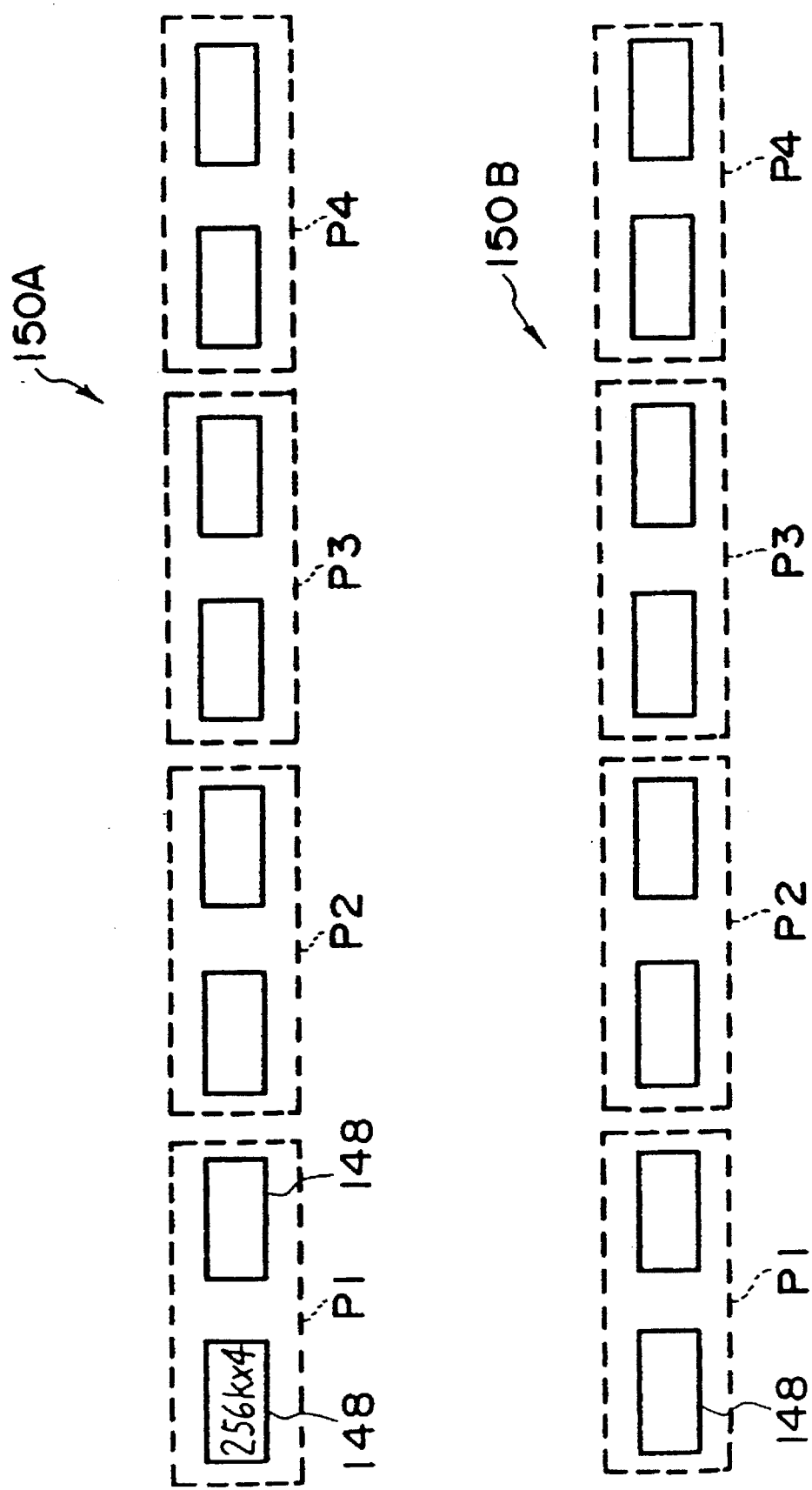
FIG. 4 is diagrams of physical configurations of memories of the page buffer in the font display section.

A description will be given of the physical configuration of the page buffer. As shown in FIG. 4, the page buffer 150 has sixteen 1M-bit dynamic RAMs (DRAMs each made up of 256k×4 bits) 148 so as to store all the data on one image, i.e., the data on pixels comprised of 4096 dots in the horizontal direction and 4096 scanning lines in the vertical direction. In the page buffer 150, the sixteen DRAMs 148 are divided into two sets of eight DRAMs 148, thereby constituting the memory group 150A and the memory group 150B. Each of the memory groups 150A and 150B is used by being further divided into four planes, i.e., a first plane (P1), a second plane (P2), a third plane (P3), and a fourth plane (P4), each consisting of two DRAMs 148.

Similarly, each of the page buffers 152 and 154 has sixteen DRAMs, and the page buffer 152 is comprised of a memory group 152A and a memory group 152B, while the page buffer 154 is comprised of a memory group 154A and a memory group 154B. In the same way as described above, each of the memory groups 152A, 152B, 154A, and 154B is used by being further divided into the four planes, i.e., the first plane (P1), the second plane (P2), the third plane (P3), and the fourth plane (P4), each consisting of two DRAMs 148.

Figure 5:
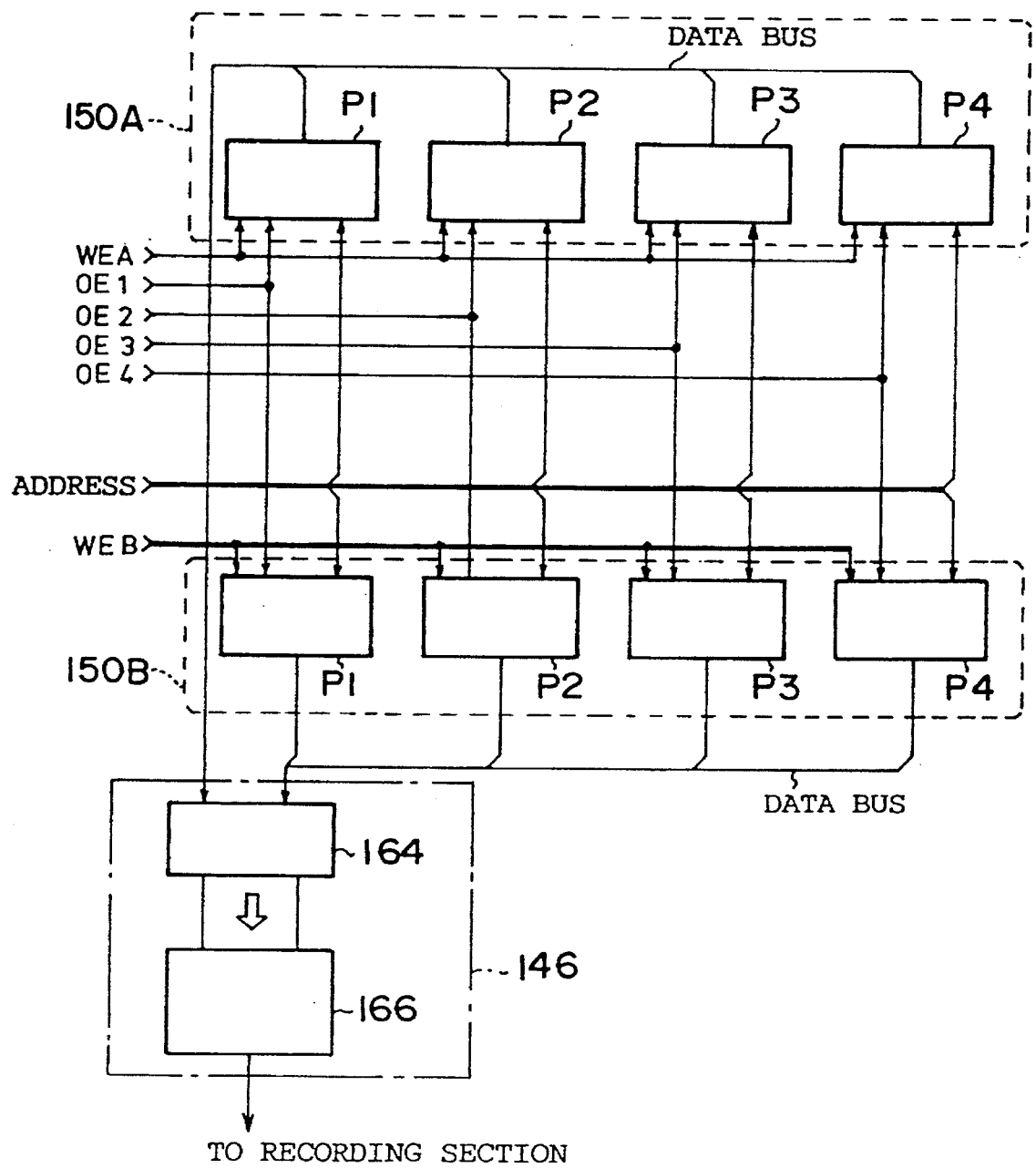
FIG. 5 is a diagram illustrating the relationship of connection between groups of memories of the page buffer in the font display section.

As shown in FIG. 5, an address bus is connected in common to the four planes (P1–P4) of the memory group 150A of the page buffer 150. As a result, by designating one address, the operation (read and write) of the DRAMs 148 in the four planes (P1–P4) is made possible. Since the DRAMs 148 in the respective planes (P1–P4) are capable of transmission and reception of 8-bit data by the designation of the address, 32-bit data can be transmitted or received by the designation of one address.

In addition, the address bus is also connected to the four planes (P1–P4) of the memory group 150B of the page buffer 150 in common with the memory group 150A. Consequently, since the image data in the two areas, i.e., the memory groups 150A and 150B, can be designated by using one address, 64-bit data can be transmitted or received simultaneously.

Read control signal lines are respectively connected to the four planes (P1–P4) comprised of the DRAMs 148 of the memory group 150A in the above-described page buffer 150 such that read control signals (output enable signals) OE1, OE2, OE3, and OE4 are inputted to the corresponding planes. In addition, a write control signal line is connected to the respective planes such that a write control signal WEA is inputted thereto in common. For instance, as the control signal OE1 is inputted, the contents (8 bits) of the DRAMs in the plane P1 can be read. For this reason, if one address is designated, and one of the control signals OE1, OE2, OE3, and OE4 is designated, it is possible to read the image data in a predetermined plane at that address. Meanwhile, as the control signal WEA is inputted, it becomes possible to write in all the planes at that address, so that it is possible to simultaneously store the image data of the predetermined bit length (32 bits).

Similarly, read control signal lines are connected to the four planes (P1–P4) of the memory group 150B in the page buffer 150 in common with the aforementioned lines for the read control signals OE1, OE2, OE3, and OE4 for the memory group 150A. In addition, a connection is provided such that a write control signal WEB is inputted to the respective planes in common.

Consequently, at the time of writing, by designating the write control signal WEA or WEB, writing into the memory group 150A or 150B is effected. At the time of reading, by inputting the address and the read control signal OE1, OE2, OE3, or OE4, the image data at the same address and in the same plane is read from both the memory groups 150A and 150B.

It should be noted that the page buffers 152 and 154 are arranged in the same way.

The image data outputted from the page buffers 150, 152, and 154 are outputted to the recording buffer 146.

As shown in FIG. 1, the soft form memory 142 is connected to the soft form table 144. This soft form table 144 reads the ruled-line data (see FIG. 6), stored in the soft form memory 142, from the soft from memory 142 in correspondence with the ruled-line pattern to be recorded on the photosensitive material. The page buffers 150, 152, and 154 are connected in parallel with the soft form memory 142, and the ruled-line data thus read is written into a predetermined page buffer.

As shown in FIG. 6, if the image data is referred to for each scanning line, a ruled-line pattern 156, for example, is classified into three kinds of ruled-line data, ruled-line data F1, F2, and F3. The ruled-line data F1 represents no data, the ruled-line data F2 represents horizontal-line data of the ruled line, and the ruled-line data F3 represents vertical-line data of the ruled line. Accordingly, the ruled-line pattern 156 can be formed if, among these three kinds of ruled-line data, the ruled-line data corresponding to the positions of the scanning lines are combined by a one-image portion. Hence, it suffices if only these three kinds of ruled-line data F1, F2, and F3 are stored in the soft form memory 142. When the ruled-line pattern 156 is formed, the soft form table 144 is adapted to designate the ruled-line data and the positions of the scanning lines so as to allow the ruled-line data corresponding to the scanning lines of the image data to be written into a predetermined page buffer.

As shown in FIG. 1, the page buffers 150, 152, and 154 are connected to the recording buffer 146. This recording buffer 146 comprises a register group 164 and a buffer group 166. For instance, the image data outputted from the page buffers are latched by the register group 164, and are sent to the laser recording section 200 via the buffer group 166 (see FIG. 5).

Figure 7:
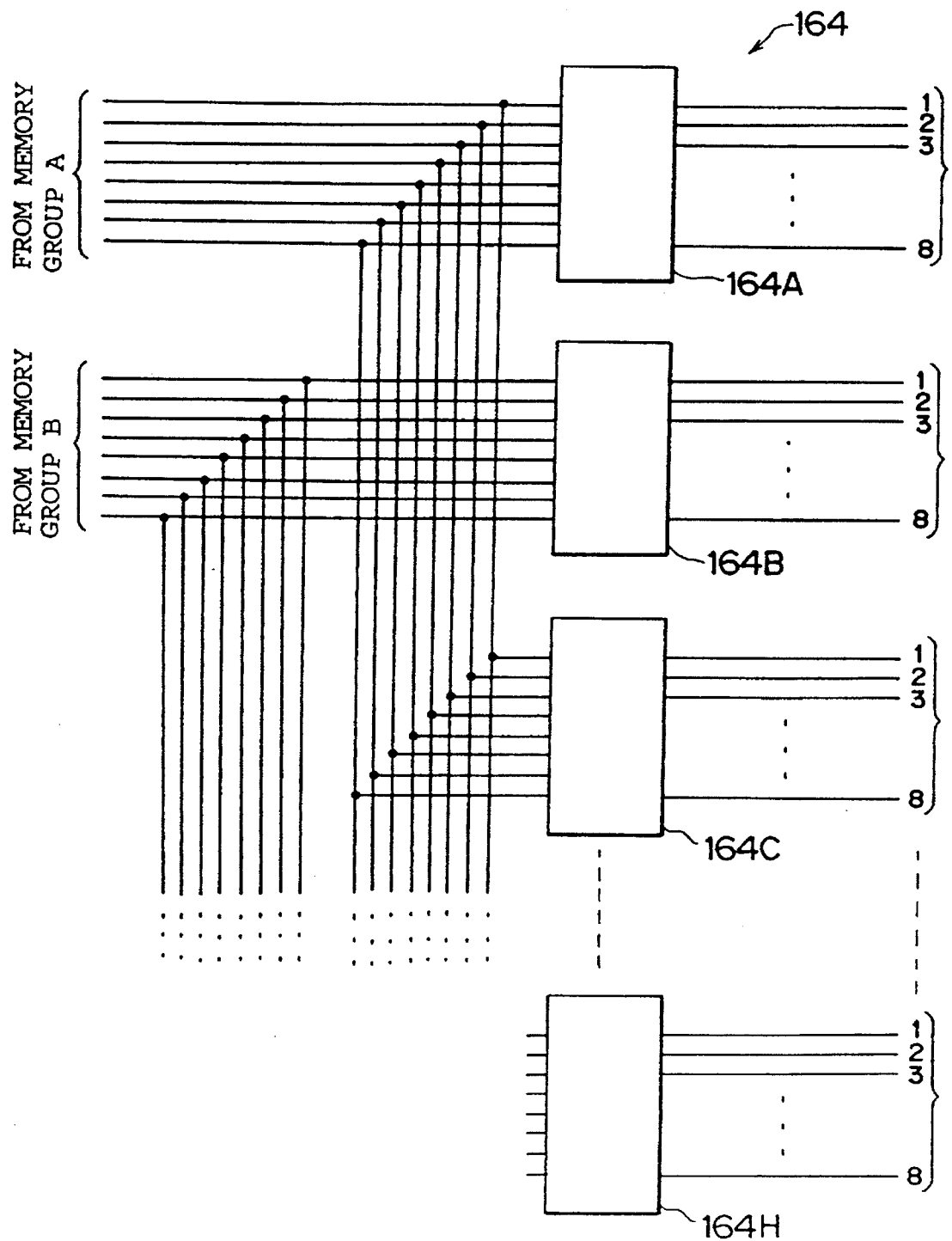
FIG. 7 is a diagram illustrating the relationship between inputs and outputs of registers which are constituent elements of a recording buffer in the font display section.

As shown in FIG. 7, the register group 164 of the recording buffer 146 comprises registers 164A, 164B, 164C, 164D, 164E, 164F, 164G, and 164H, which are connected such that the image data outputted from the memory groups of each page buffer are inputted to the registers in parallel (8 bits). The connection provided is such that the image data outputted from the memory group 150A of the page buffer 150, for instance, is inputted to the registers 164A, 164C, 164E, and 164G in common, while the image data outputted from the memory group 150B is inputted to the registers 164B, 164D, 164F, and 164H in common. Then, as a control signal is inputted to an unillustrated control end, the image data is latched. Thus, since the image data outputted from the memory groups 150A and 150B are 8-bit signals, respectively, it suffices if eight common signal lines are used. The connection is provided such that the respective image data outputted from the registers 164A–164H are inputted to the buffer 166 in a comic mode 160 and a cine mode 162 (see FIG. 10) designating the directions of recording of the image, which will be described later.

The image data from the memory groups 152A and 152B and the memory groups 154A and 154B of the page buffers 152 and 154 are changed over by an unillustrated changeover means in response to a control signal from the CPU 112. These image data are latched by the register group 164 in the same way as described in connection with the page buffer 150.

Figure 8:
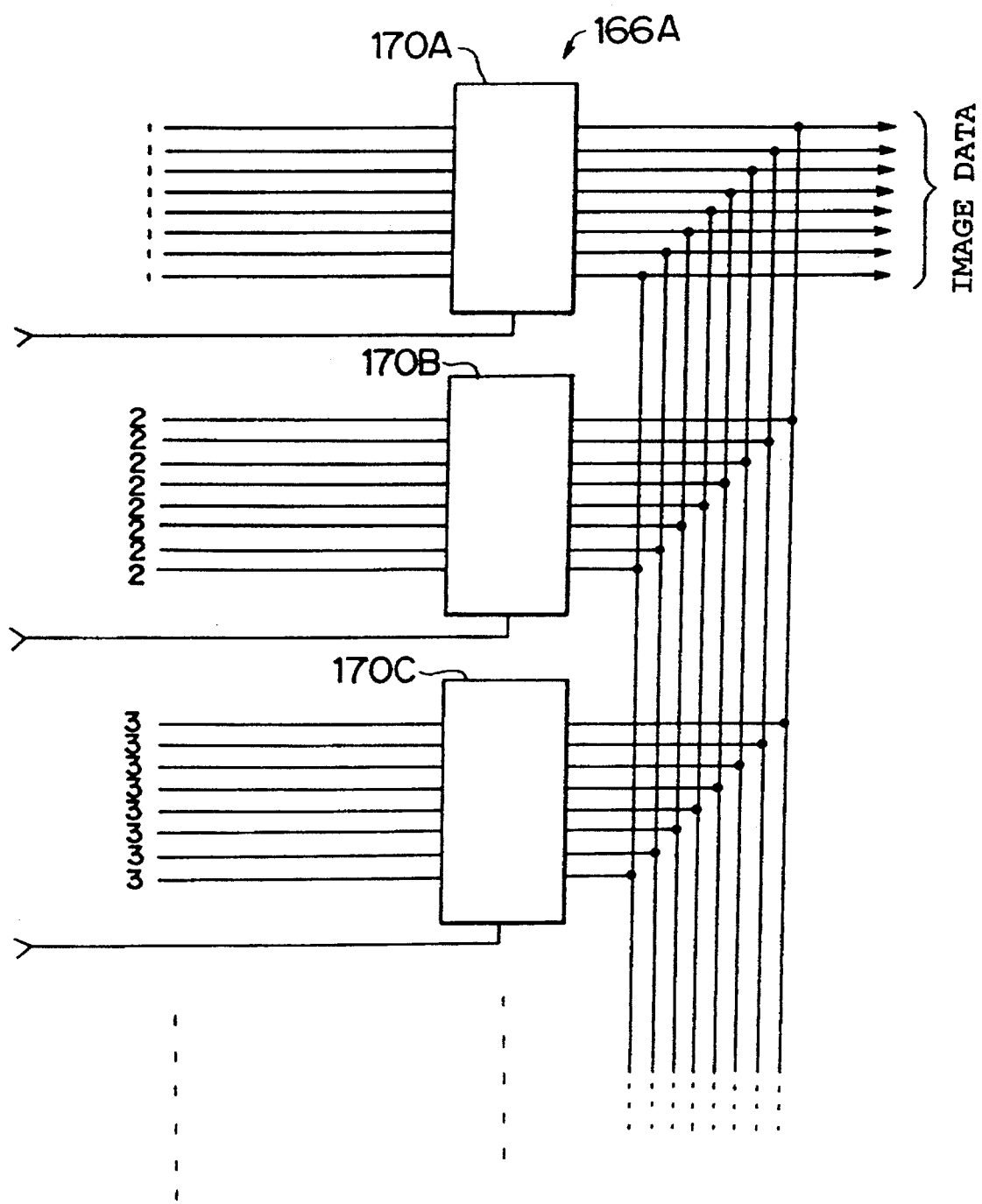
FIG. 8 is a diagram illustrating the configuration of inputs and outputs of a buffer for a comic mode in the recording buffer of the font display section.

As shown in FIG. 8, a buffer 166A in the comic mode in the buffer group 166 comprises buffer elements 170A, 170B, 170C, 170D, 170E, 170F, 170G, and 170H. The connection provided is such that the image data outputted from the respective registers 164A–164H of the register group 164 and having the same number of bits (8 bits) are inputted to the respective buffer elements 170A–170H. In addition, the outputs of the buffer elements 170A–170H are made common.

Figure 9:
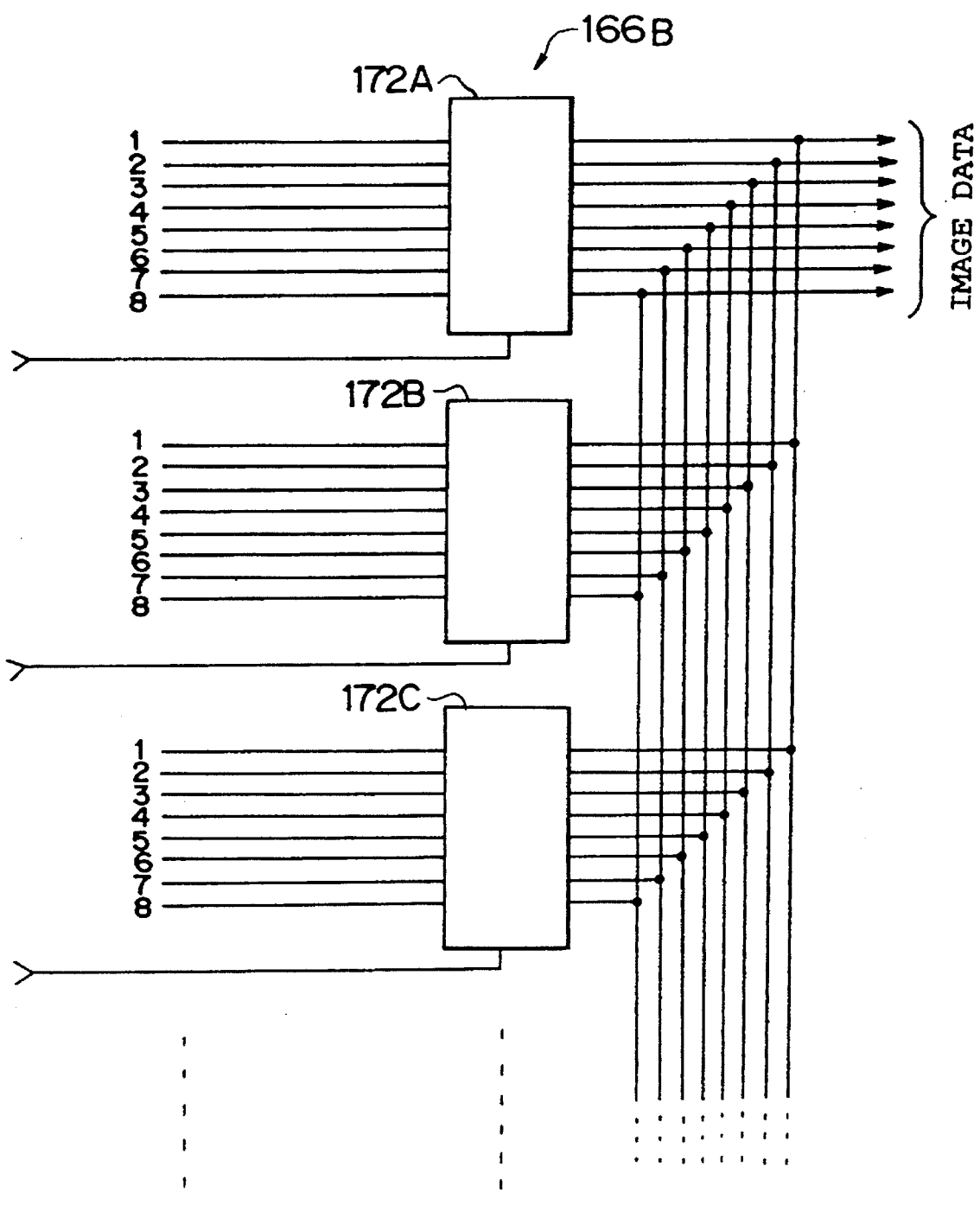
FIG. 9 is a diagram illustrating the configuration of inputs and outputs of a buffer for a cine mode in the recording buffer of the font display section.

Meanwhile, a buffer 166B in the cine mode in the buffer group 166 comprises buffer elements 172A, 172B, 172C, 172D, 172E, 172F, 172G, and 172H, as shown in FIG. 9. The respective buffer elements 172A–172H are connected in parallel with the respective registers 164A–164H of the register group 164. In addition, the outputs of the buffer elements 172A–172H are made common.

It should be noted that the outputs of the buffer 166A in the comic mode and of the buffer 166B in the cine mode are made common, and the image data are sent in units of 8 bits.

The recording buffer 146 is connected to the laser recording section 200, and the image data are sent to the laser recording section 200 in response to a control signal from the laser recording section 200.

It should be noted that by connecting a first-in-first-out (FIFO) to the output side of the recording buffer 146, the output speed of the image data can be made higher.

Next, a description will be given of a control program for controlling the font display section 100.

Figure 12:
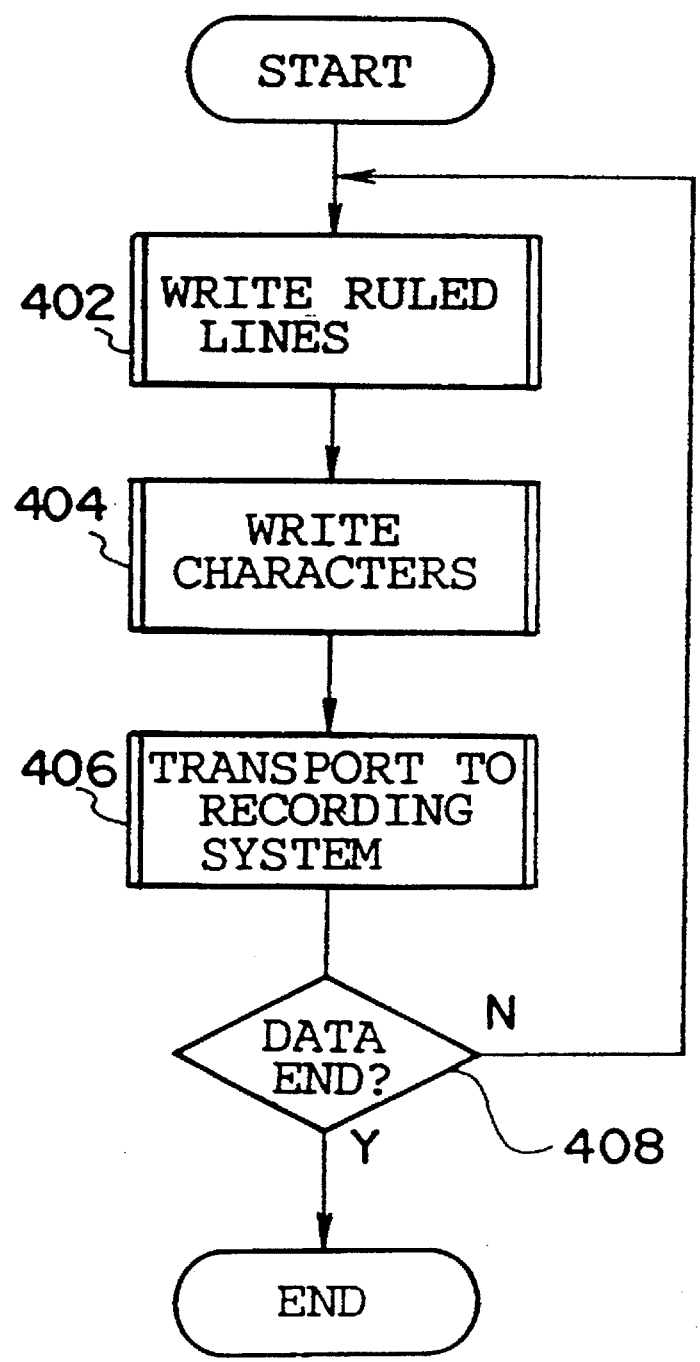
FIG. 12 is a flowchart illustrating a main control routine of the font display section.

First, to facilitate an understanding, a description will be given of the control of the page buffer 150. As shown in FIG. 12, when a main control routine is started, the operation proceeds to Step 402. In Step 402, a subroutine for writing the soft form (ruled lines) is executed, and ruled lines are written into the page buffer 150. Upon completion of the writing of the ruled lines, the operation proceeds to Step 404. In Step 404, a subroutine for writing characters is executed, and the font data is written into the page buffer 150. Upon completion of the writing of the characters, the operation proceeds to Step 406. In Step 406, a subroutine for reading the image data is executed, and the image data to be sent to the recording system is read from the page buffer 150. Upon completion of the reading of the image data, the operation proceeds to Step 408. In Step 408, a determination is made as to whether or not the recording of all the image data has been completed, and if image data to be recorded still remains, the operation returns to Step 402. If the recording of all the image data has been completed, this main routine ends.

Here, in this embodiment, three page buffers are provided, and control is effected in such a manner that the above-described processing is performed for each page buffer.

Figure 11:
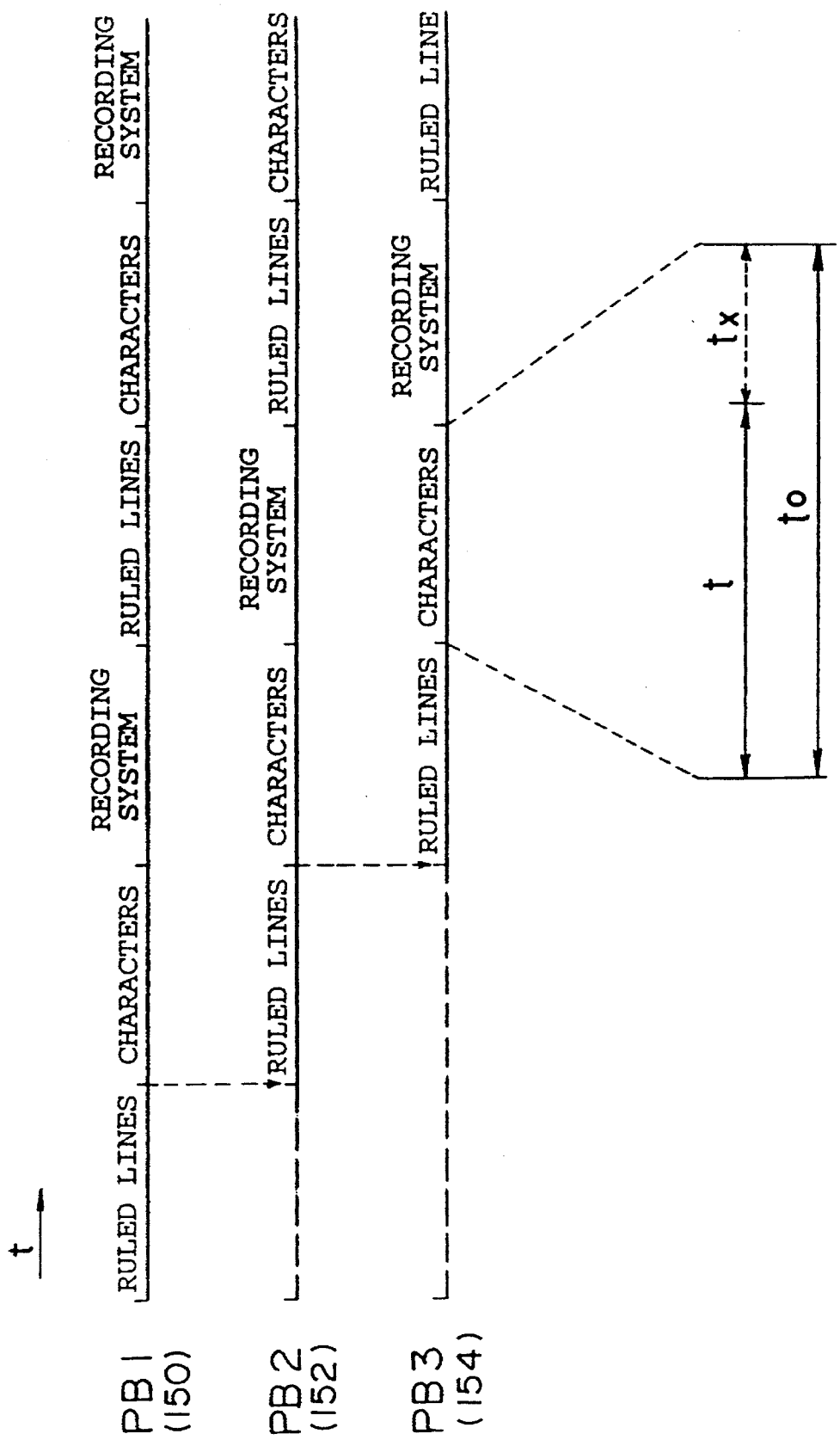
FIG. 11 is a diagram illustrating a timing chart for each processing in the page buffers in the font display section.

Next, a description will be given of the control of the three page buffers. As shown in FIG. 11, when control is started, as described in connection with FIG. 12, in the page buffer 150, the writing of the soft form (ruled lines) into the page buffer 150 is executed. Upon completion of the writing of ruled lines, the writing of characters into the page buffer 150 is executed. Upon completion of the writing of the characters, the image data to be sent to the recording system are read from the page buffer 150. Then, these processing steps are executed repeatedly. In the page buffer 152, when the writing of the characters into the page buffer 150 is started, as described in connection with FIG. 12, the writing of the soft form (ruled lines) into the page buffer 152 is executed, the writing of the characters into the page buffer 152 is then executed, and the image data to be sent to the recording system are subsequently read from the page buffer 152. Then, these processing steps are executed repeatedly. In the page buffer 154, when the writing of the characters into the page buffer 152 is started, as described in connection with FIG. 12, the writing of the soft form (ruled lines) into the page buffer 154 is executed, the writing of the characters into the page buffer 154 is then executed, and the image data to be sent to the recording system are read from the page buffer 154. Then, these processing steps are executed repeatedly. Thus, as the page buffers 150, 152, and 154 effect different processing, the image data are constantly sent to the laser recording section 200 without any pause in the transmission of the image data.

It should be noted that the time duration for writing the characters into each of the above-described page buffers varies depending on the volume of the characters to be written (e.g., a minimum t, a maximum t+tx), a predetermined processing time t0 (=t+tx) is set in advance as the processing time for writing the characters. In a case where the number of the characters is small and the processing time is shorter than the predetermined processing time t0, the CPU 112 effects control such that the processing for writing the character data is set in a wait state for the time duration tx in FIG. 11.

Next, a description will be given of the subroutine for writing the soft form (ruled lines). Although a description will be given below of the page buffer 150, the same applies to the page buffers 152 and 154.

Figure 13:
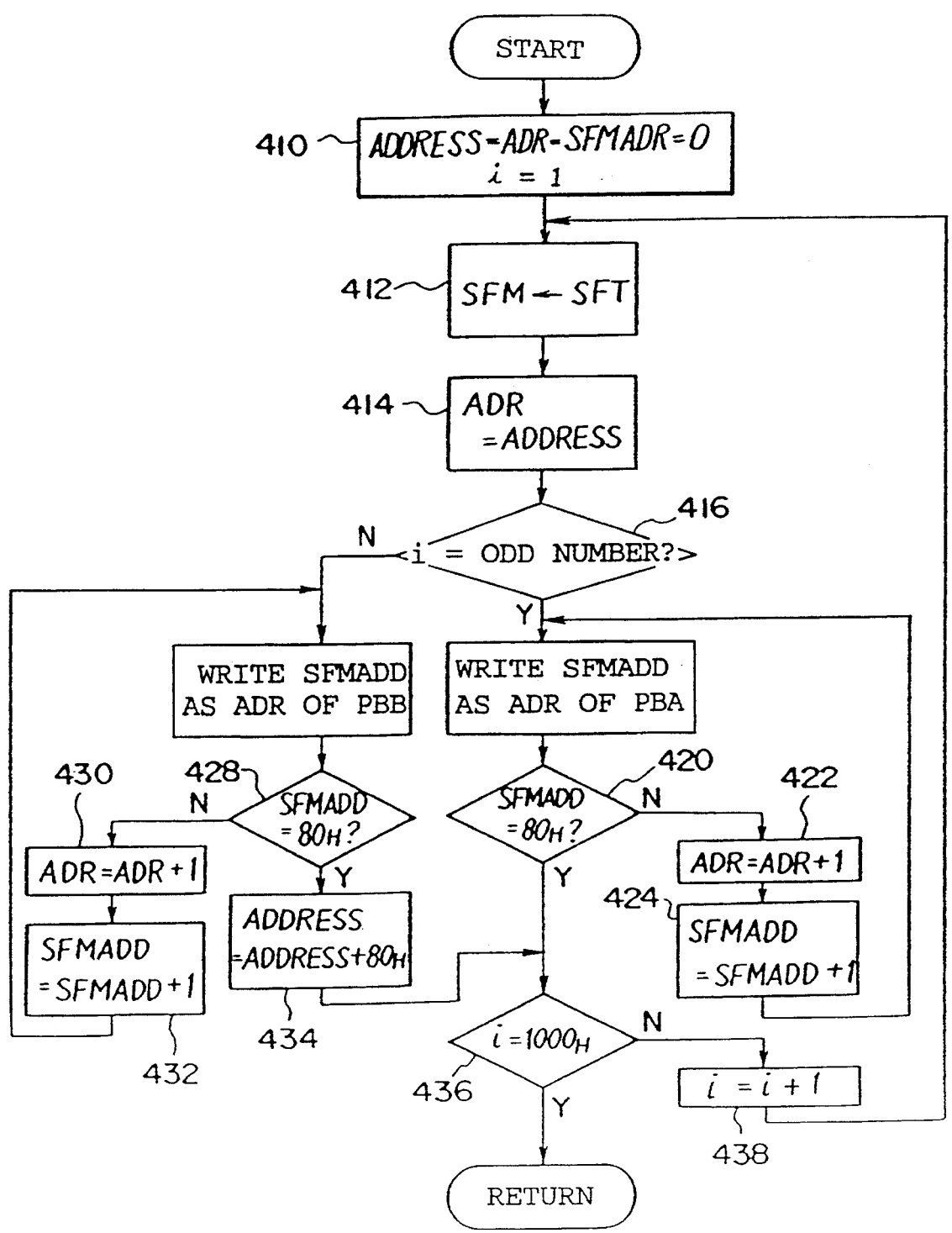
FIG. 13 is a flowchart illustrating a subroutine for writing a soft form (ruled lines) in the font display section.

As shown in FIG. 13, when this subroutine is started, the operation proceeds to Step 410. In Step 410, an initial value of a counter i is set to 1, and 0 is set as initial values of variables ADDRESS, ADR, and SFMADR. These variables ADDRESS and ADR are variables for storing the addresses of the page buffer 150 when reading and writing are performed with respect to the memories of the page buffer 150 in this subroutine. In addition, the ruled-line data on one scanning line stored in the soft form memory 142 are divided into units of 32 bits, and one of numerical values (0–80H (H indicates a hexadecimal number), or 0–127 in decimal notation) that specifies a 32-bit area in that one scanning line is used as the variable SFMADR. Upon completion of the setting of the initial values, the operation proceeds to Step 412. In Step 412, the soft form table 144 designates a one-scanning-line portion of the ruled-line data stored in the soft form memory 142, and the operation proceeds to step 414. In Step 414, the value of the ADDRESS is stored as the variable ADR, and the operation proceeds to Step 416.

In Step 416, by determining whether or not the count of the counter i is an odd number, a determination is made as to whether or not the memory group into which the rule lines are written is the memory group (PBA) 150A or the memory group (PBB) 150B. If the count of the counter i is an odd number, the operation proceeds to Step 418 to start the writing of the ruled lines into the memory group 150A. If the count of the counter i is an odd number, the operation proceeds to Step 426 to start the writing of the ruled lines into the memory group 150B.

In Step 418, data in an SFMADD area of the ruled-line data in the soft form memory 142 is written at the address of the ADR value of the memory group 150A in the page buffer 150. Upon completion of the writing of the data, the operation proceeds to Step 420. In Step 420, by determining whether or not SFMADD=80H, a determination is made as to whether or not the writing of the one-scanning-line portion of the ruled-line data has been completed. If it has not been completed, the operation proceeds to Step 422 to increment ADR by 1. Then, in Step 424, SFMADD is incremented by 1, and the operation returns to Step 418. If SFMADD=80H, it is determined that the writing of the one-scanning-line portion of the ruled-line data has been completed, and the operation proceeds to Step 436.

Meanwhile, in Step 426, data in an SFMADD area of the ruled-line data in the soft form memory 142 is written at the address of the ADR value of the memory group 150B in the page buffer 150. Upon completion of the writing of the data, the operation proceeds to Step 428. In Step 428, by determining whether or not SFMADD=80H, a determination is made as to whether or not the writing of the one-scanning-line portion of the ruled-line data has been completed. If it has not been completed, the operation proceeds to Step 430 to increment ADR by 1. Then, in Step 432, SFMADD is incremented by 1, and the operation returns to Step 426. If SFMADD=80H, it is determined that the writing of the one-scanning-line portion of the ruled-line data has been completed, and the operation proceeds to Step 434. In Step 434, 80H is added to ADDRESS so as to set the address in the page buffer 150 as the address of the memory for ensuring storage. Upon completion of the addition to ADDRESS, the operation proceeds to Step 436.

It should be noted that although the writing of the ruled-line data into the page buffer 150 is performed for each 32 bits, in the actual operation of the memories, the writing is performed for each 8 bits (one byte) obtained by further dividing these 32 bits.

In Step 436, by determining whether or not the counter i=1000H (4096 in decimal notation), a determination is made as to whether or not the ruled lines have been written into all the areas of the page buffer 150. If i≠1000H, it is determined that the ruled lines have not been written into all the areas of the page buffer 150, and the operation proceeds to Step 418 to increment the count i by 1. Then, the operation returns to Step 412. If i=1000H, it is determined that ruled lines have been written into all the areas of the page buffer 150, and this subroutine ends.

Next, a description will be given of the subroutine for writing the characters in the font display section.

Figure 14:
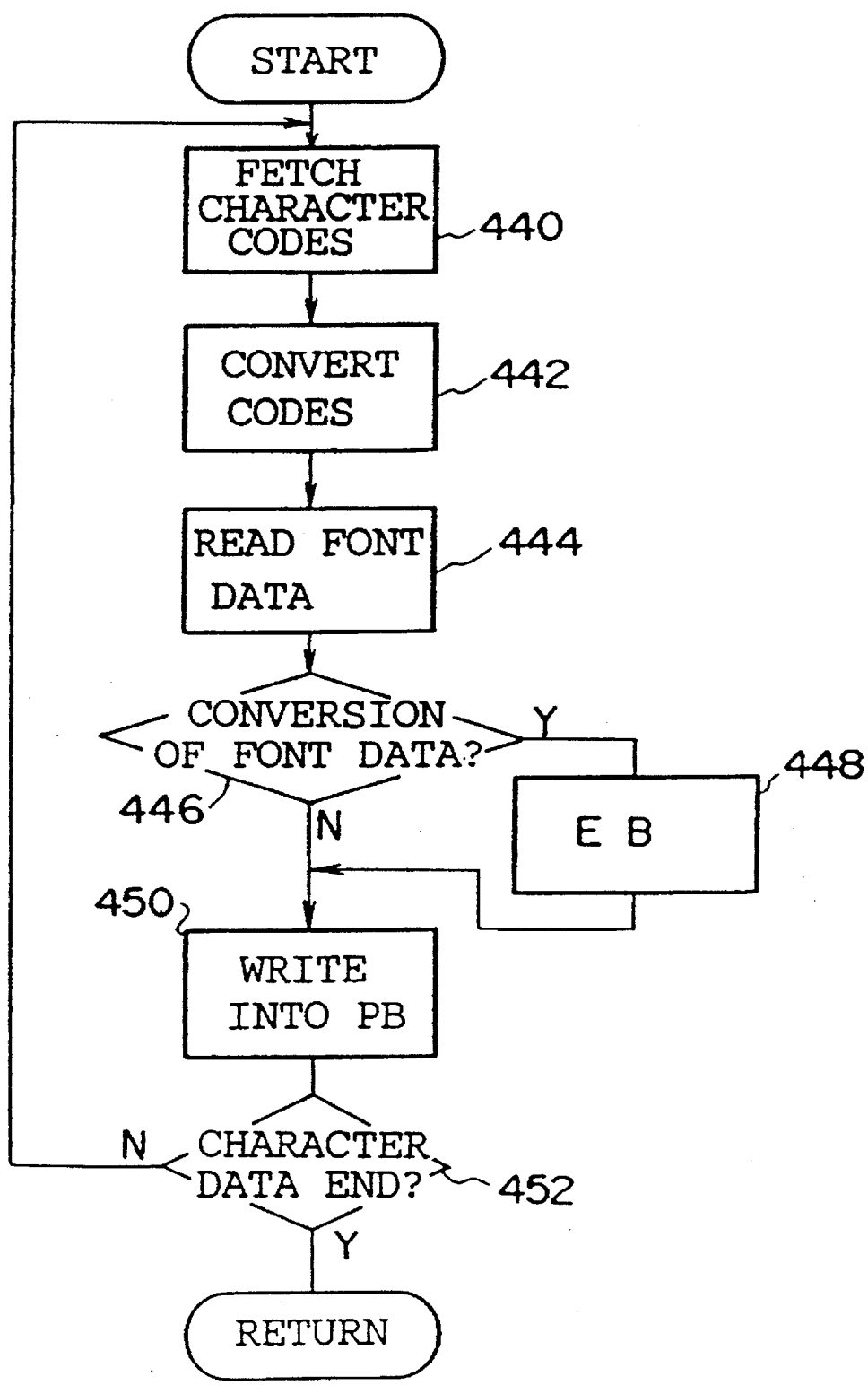
FIG. 14 is a flowchart illustrating a subroutine for writing characters in the font display section.

As shown in FIG. 14, when this subroutine is started, the operation proceeds to Step 440. In Step 440, character codes inputted from the host computer 90 are read, and the operation proceeds to Step 442. In Step 442, the inputted character codes are converted into internal codes for the laser beam recording apparatus 10 by the code converter 132. At this time, a conversion table for the character codes inputted from the host computer 90 and the internal codes is read in advance from the magnetic storage medium 94 or the like and is stored. Upon completion of the conversion into the internal codes, the operation proceeds to Step 444. In Step 444, character fonts corresponding to the converted internal codes are read from the font memory 134, thereby obtaining font data. After the font data are obtained, the operation proceeds to Step 446, and a determination is made as to whether or not there is any conversion of the font data, such as the rotation, enlargement, and reduction of the characters. If there is no conversion of the font data, the operation proceeds to Step 450. If there is any font data conversion, the operation proceeds to Step 448 in which conversion such as the rotation, enlargement, or reduction of the font data is effected by the effect buffer 136. Then, the operation proceeds to Step 450. Upon completion of the writing of the font data, the operation proceeds to Step 452. In Step 452, a determination is made as to whether or not the writing of all the characters has been completed, and if it has not been completed, the operation returns to Step 440. If it has been completed, this subroutine ends.

In Step 450, when the font data is written into the page buffer 150, there are cases where the individual characters extend over a plurality of addresses of the page buffer 150. Therefore, the page buffer 150 at the address for writing the font data is referred to. If the data thus read is the ruled-line data or the character data, a measure is provided so that its contents will not be altered. On the other hand, if the data which has been read is blank data, the character data is written, i.e., the font data is written in an overlapping manner into the page buffer 150 at that address (read-modified write).

Next, a description will be given of the subroutine for reading the image data for transmitting the image data from the font display section 100 to the laser recording section 200, as well as the subroutine of the comic and cine modes which are the modes of writing to the photosensitive material.

First, a description will be given of the comic and cine modes.

Figure 10:
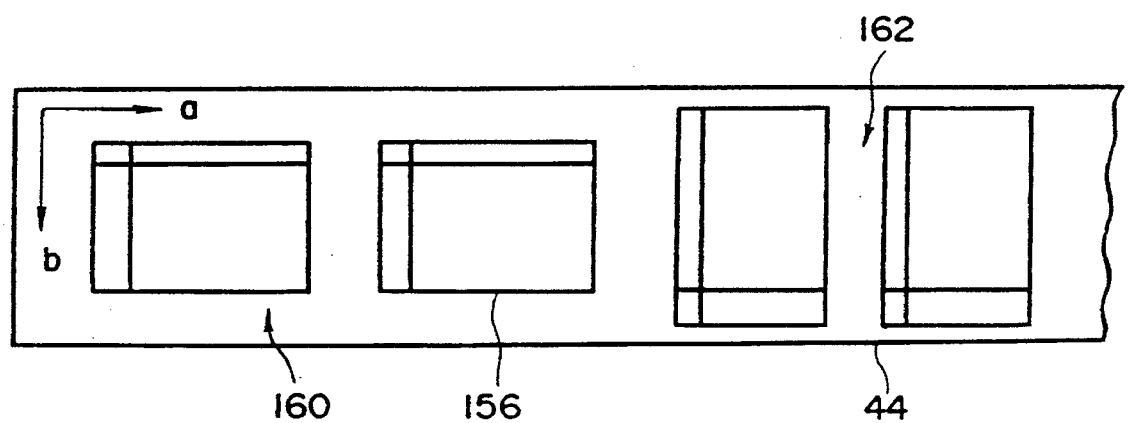
FIG. 10 is a diagram illustrating the direction of images in cases where the images are recorded on a photosensitive material in the comic mode and the cine mode.

As shown in FIG. 10, when an image is recorded on a roll film such as an 8 mm or 16 mm roll film, there are cases where an image is recorded continuously in each frame at predetermined intervals. In that case, the comic mode 160 or the cine mode 162 can be used. In the comic mode 160, recording is effected such that the image becomes horizontal in the longitudinal direction of the film (in the direction of a in FIG. 10), while in the cine mode 162, recording is effected such that the image becomes horizontal in the transverse direction of the film (in the direction of b in FIG. 10). As for these recording methods, either the comic mode 160 or the cine mode 162 is selected at the time of referring to a recorded image, i.e., depending on the configuration of the apparatus for reference or on the user's demand and the like. It should be noted that the recording in the comic mode 160 or the cine mode 162 is not restricted to the case where an image is recorded on the aforementioned roll film such as the 8 mm or 16 mm roll film.

Figure 15:
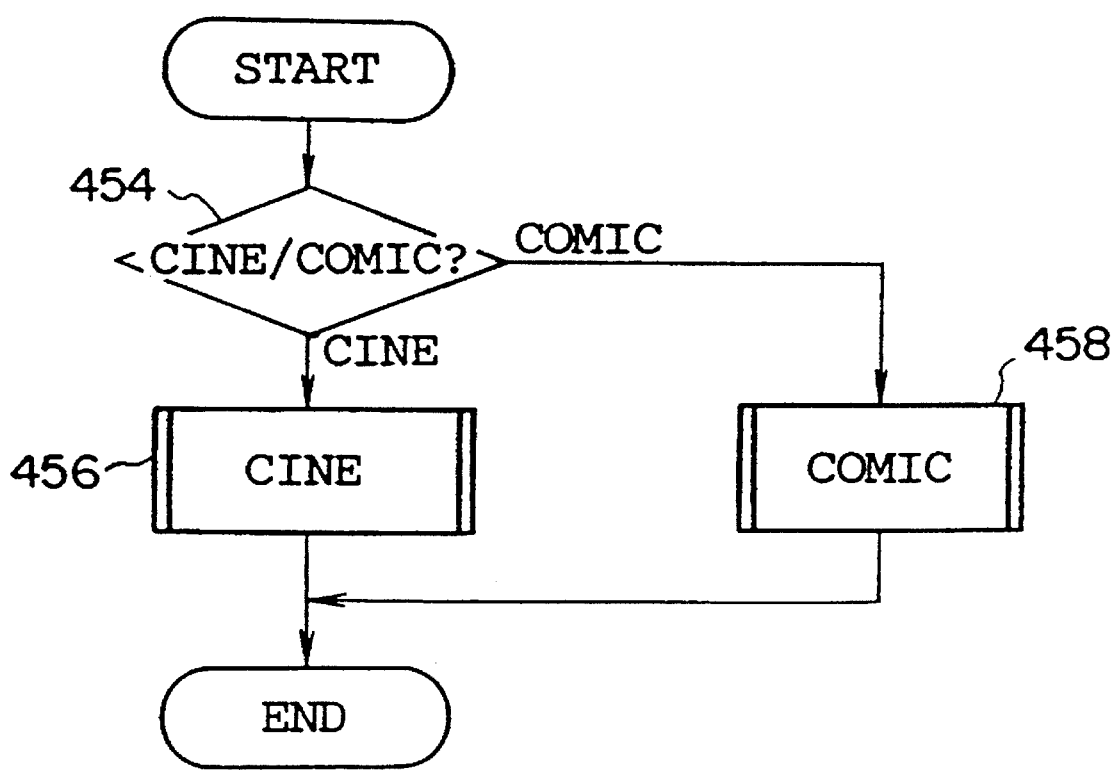
FIG. 15 is a flowchart illustrating a subroutine for reading image data in the font display section.

As shown in FIG. 15, when this routine is started, the operation proceeds to Step 454 to determine whether the mode of writing onto the photosensitive material is the comic mode or the cine mode. In the case of the comic mode, the operation proceeds to Step 458 to execute a subroutine for reading the image data in the comic mode, which will be described later. In the case of the cine mode, the operation proceeds to Step 456 to execute a subroutine for reading the image data in the cine mode, which will be described later. When these subroutines are completed, and the image data is transmitted to the laser recording section 200, this routine ends.

Figure 16:
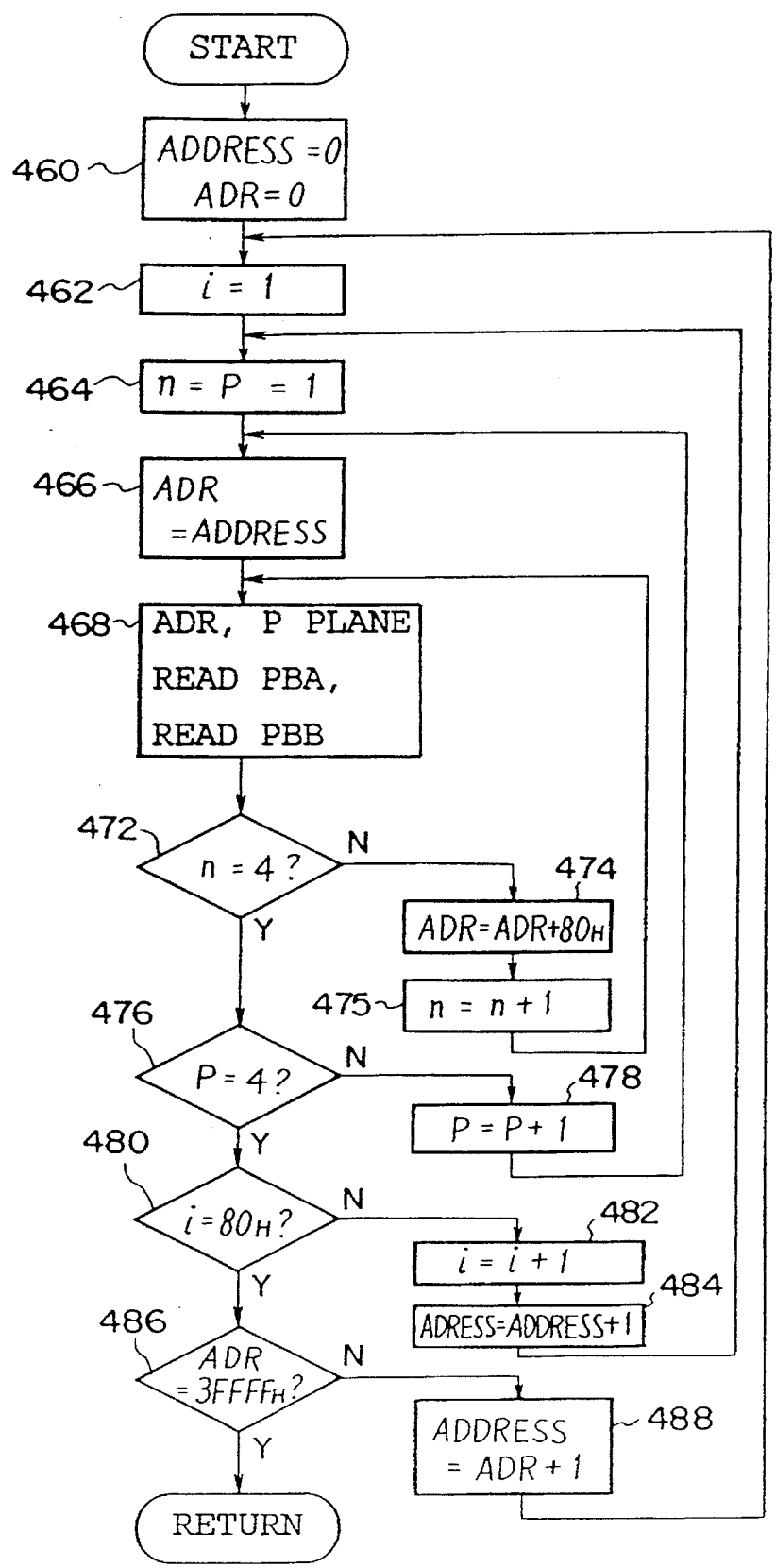
FIG. 16 is a flowchart illustrating a subroutine for reading the image data in the comic mode.

As shown in FIG. 16, when the reading of memory in the comic mode is selected, the operation proceeds to Step 460. In Step 460, 0 is set as the variables ADDRESS and ADR as initial values. These variables ADDRESS and ADR are variables for storing addresses of the page buffer 150 when memory of the page buffer 150 is read in this subroutine. When the initial values are set, the operation proceeds to Step 462. In Step 462, 1 is set as the counter value i which is the number of times of processing, and the operation proceeds to Step 464. In Step 464, 1 is set as the numerical value n and the plane number P. It should be noted that a numerical value (n=1–4) up to ½ (since the page buffer 150 is divided into two as memory groups) of the number of laser beams for conducting main scanning simultaneously can be stored as this numerical value n. The plane number P indicates the plane number (P=1–4) of an address where each higher 8 bits is sequentially numbered in a case where the image data having 32 bits at one address are divided into units of 8 bits.

In Step 466, the value of ADDRESS is stored as the variable ADR. When the value is stored as this variable, the operation proceeds to Step 468. In Step 468, the 8-bit image data in the P plane is read among the image data stored at the address of the ADR value of the memory group 150A in the page buffer 150. At the same time, the 8-bit image data in the P plane is read among the image data stored at the address of the same ADR value of the memory group 150B. Upon completion of the reading of the data, the operation proceeds to Step 472. In Step 472, by determining whether or not n=4, a determination is made as to whether or not the image data corresponding to the number of the laser beams for effecting main scanning simultaneously have been read. If n≠4, the operation proceeds to Step 474, and 80H is added to the variable ADR to designate an address of an ensuing scanning line. Then, in Step 475, n is incremented by 1, and the operation returns to Step 468. If n=4, the operation proceeds to Step 476.

In Step 476, by determining whether or not P=4, a determination is made as to whether or not the reading of image data at one address (32 bits) has been completed. If P≠4, it is determined that the reading of the image data at that address has not been completed. Therefore, the operation proceeds to Step 478 to increment the plane number P by 1, and the operation returns to Step 466. If P=4, a determination is made that the reading of the image data at one address has been completed, and the operation proceeds to Step 480.

In Step 480, a determination is made as to whether or not i=80H. If i=80H, it is determined that the reading of the image data of one scanning line has been completed, and the operation proceeds to Step 486. If i≠80H, it is determined that the reading of the image data of one scanning line has not been completed, and the operation proceeds to Step 482. In Step 482, the counter value i is incremented by 1, the variable ADDRESS is incremented by 1 in Step 484, and the operation returns to Step 464.

In Step 486, by determining whether or not ADR=3FFFF, a determination is made as to whether or not the reading of the image data of one recorded image has been completed. If it has not been completed, the operation proceeds to Step 488, and after performing the calculation ADDRESS= ADR+1, the operation returns to Step 462. Upon completion of the reading of the image data of one recorded image, this routine ends.

Next, a description will be given of the cine mode.

Figure 17:
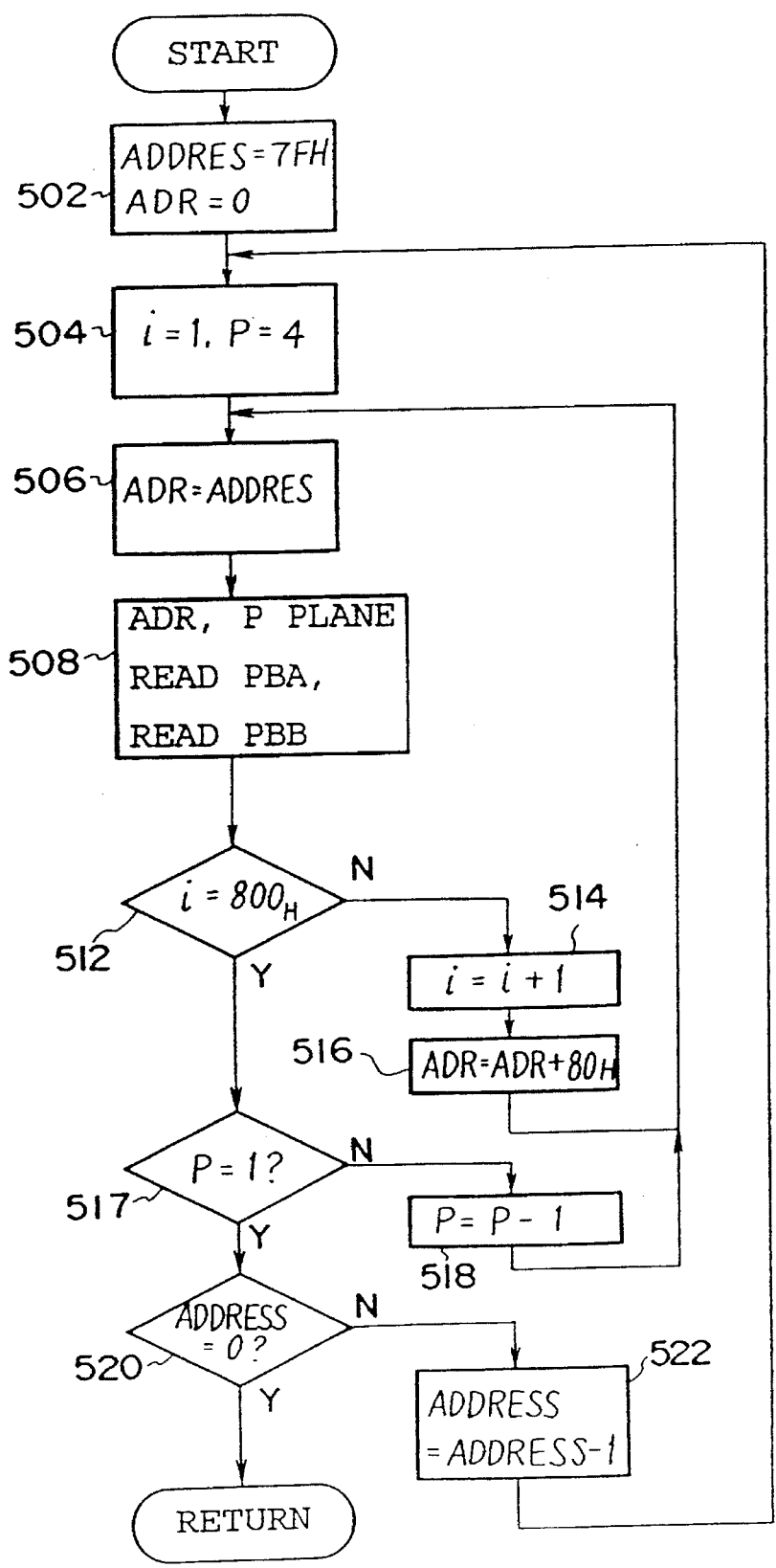
FIG. 17 is a flowchart illustrating a subroutine for reading the image data in the cine mode.

If the reading of memory in the cine mode is selected, as shown in FIG. 17, the operation proceeds to Step 502. In Step 502, 7FH and 0 are set as the variables ADDRESS and ADR, respectively, as initial values. These variables ADDRESS and ADR are variables for storing addresses of the page buffer 150 when memory of the page buffer 150 is read in this subroutine. After initial values are set, the operation proceeds to Step 504. In Step 504, 1 is set as the counter i, and 4 is set as the plane number P. The operation then proceeds to Step 506. It should be noted that the plane number P indicates the plane number (P=1–4) of an address where each higher 8 bits is sequentially numbered in a case where the image data having 32 bits at one address are divided into units of 8 bits.

In Step 506, the value of ADDRESS is stored as the variable ADR. When the value is stored as this variable, the operation proceeds to Step 508. In Step 508, the 8-bit image data in the P plane is read among the image data stored at the address of the ADR value of the memory group 150A in the page buffer 150. At the same time, the 8-bit image data in the P plane is read among the image data stored at the address of the same ADR value of the memory group 150B. Upon completion of the reading of the data, the operation proceeds to Step 512.

In Step 512, a determination is made as to whether or not i=800H (2048 in decimal notation). If i=800H, it is determined that the reading of the image data in the P planes designated by the addresses, in the Y-direction (in the sub-scanning direction) in FIG. 3, of the image has been completed, and the operation proceeds to Step 517. If i≠800H, it is determined that the reading of the image data has not been completed, and the operation proceeds to Step 514. In Step 514, the counter value i is incremented by 1, and the operation proceeds to Step 516. In Step 516, 80H is added to the variable ADR to designate an address corresponding to an ensuing scanning line of the page buffer to be read, and the operation returns to Step 506. In Step 517, a determination is made as to whether or not P=1, and if P=1, it is determined that the reading of the image data designated by the addresses, in the Y-direction (in the sub-scanning direction) in FIG. 3, of the image has been completed, and the operation proceeds to Step 520. If P≠1, it is determined that a plane whose image data has not been read remains in the memory designated by this address, and the operation proceeds to Step 518. In Step 518, the plane number P is decremented by 1, and the operation returns to Step 506. In Step 520, by determining whether or not ADR=3FFFFH (final address of the image data), a determination is made as to whether or not the reading of the image data of one recorded image has been completed. If it has not been completed, the operation proceeds to Step 522. In Step 522, the variable ADDRESS is decremented by 1, and the operation returns to Step 504. If ADR=3FFFFH, it is determined that the reading of the image data of one recorded image has been completed, and this subroutine ends.

Next, a description will be Given of the laser recording section 200 of the laser beam recording apparatus 10.

Figure 18:
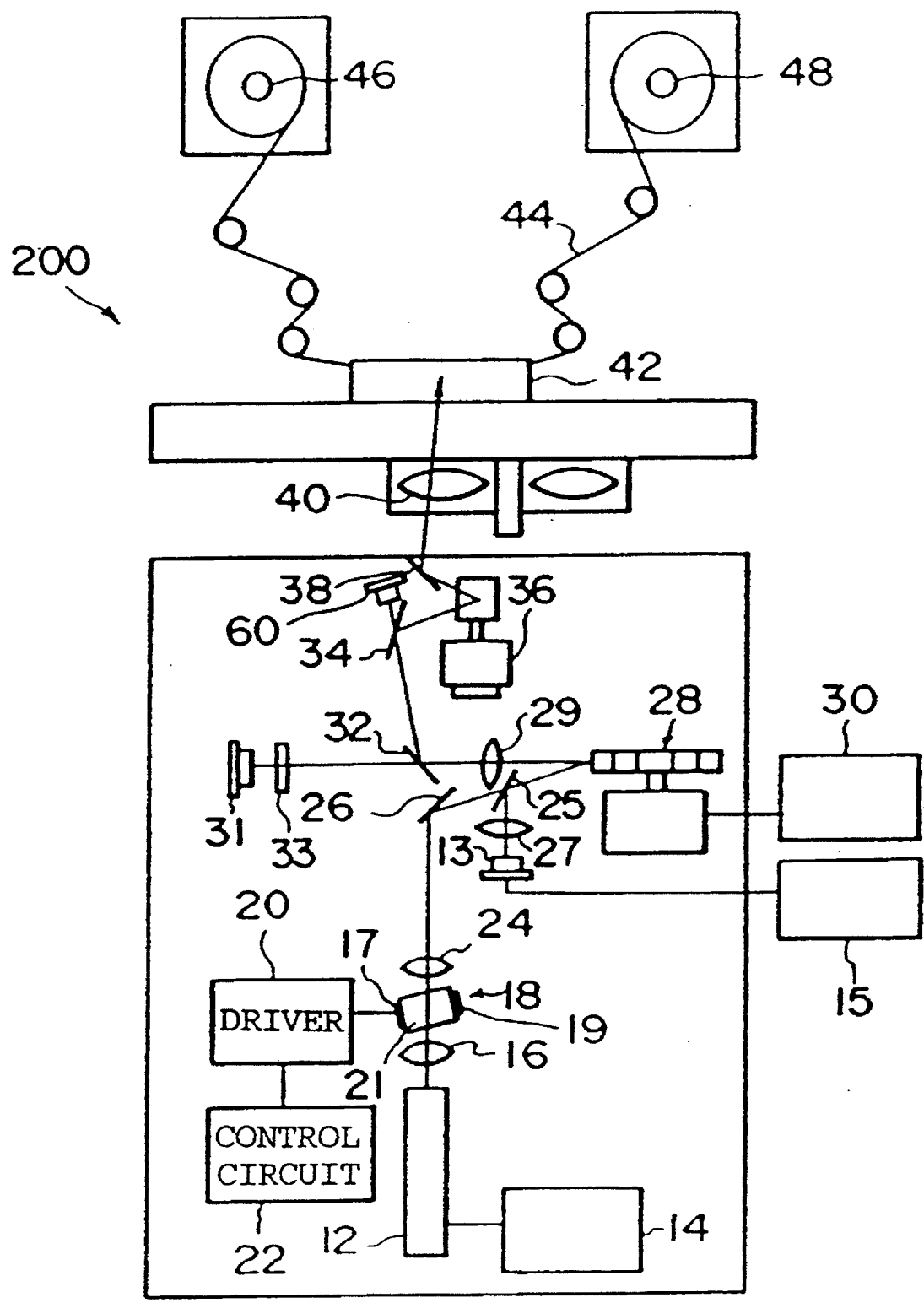
FIG. 18 is a schematic diagram illustrating a laser recording section of a laser beam scanner.

As shown in FIG. 18, the laser recording section 20 of the laser beam recording apparatus 10 has a He-Ne laser 12 connected to a power source 14. Another type of gas laser, a semiconductor laser, or the like may be used instead of this He-Ne laser. A lens 16, an AOM (acousto-optic modulator) 18, and a lens 24 are arranged in order on the laser-beam emergent side of the He-Ne laser 12. The AOM 18 has an acousto-optic medium 21 which produces an acousto-optic effect. Attached to the opposite sides of the acousto-optic medium 21 are a transducer 17 for outputting ultrasonic waves corresponding to an inputted high-frequency signal and a sound absorbing material 19 for absorbing the ultrasonic waves propagated through the acousto-optic medium 21. The transducer 17 is electrically connected to an AOM driver 20 for driving the AOM, and the AOM driver 20 is in turn electrically connected to a control circuit 22.

In this embodiment, a laser bee made incident upon the AOM 18 is made emergent by being divided into eight laser beams. Arranged in order on the laser-beam emergent side of the lens 24 are a mirror 26, a dichroic mirror 25, a polygon mirror 28, a lens 29, and a dichroic mirror 32. A semiconductor laser 13 is arranged in such a manner that a laser beam for reference is made incident upon the dichroic mirror 25 via a lens 27. A semiconductor laser driver 15 is electrically connected to the semiconductor laser 13. A polygon driver 30 for rotating the polygon mirror 28 at high speed is electrically connected to the polygon mirror 28. In addition, a linear encoder 33 and a photoelectric converter 31 are arranged in order at positions at which they are capable of receiving the laser beam for reference which has passed through the dichroic mirror 32. For this reason, the laser beam for reference reflected by the polygon mirror 28 is transmitted through the dichroic mirror 32 and is made to scan across the linear encoder 33. The linear encoder 33 comprises a plate in which transparent portions and opaque portions are alternately arranged in the form of a grid at fixed pitches in the main-scanning direction. When this linear encoder 33 is scanned by the laser beam for reference reflected by the polygon mirror 28, the laser beam for reference is transmitted through the transparent portions, so that a pulse signal is outputted from the photoelectric converter 31. The pulse signal from the photoelectric converter 31 is inputted to a galvanometer mirror driver for controlling the angle of a galvanometer mirror.

A sampling mirror 34, a galvanometer mirror 36, a mirror 38 are arranged in order on the reflecting side of the dichroic mirror 32. A photoelectric converter 60 is disposed at a position where it is capable of receiving the laser beam transmitted through the sampling mirror 34. This sampling mirror 34 has a low transmittance for transmitting only sufficient laser power required for the photoelectric converter 60. As a result, a decline in the laser power of the He-Ne laser 12 reflected by the sampling mirror 34 can be reduced. The laser beam reflected by the mirror 38 is applied to a stage 42 via a lens 40. A photosensitive material 44 such as a microfilm is mounted on the stage 42. This photosensitive material 44 is wound around a reel 46 and a reel 48 in the form of rolls.

Figure 19:
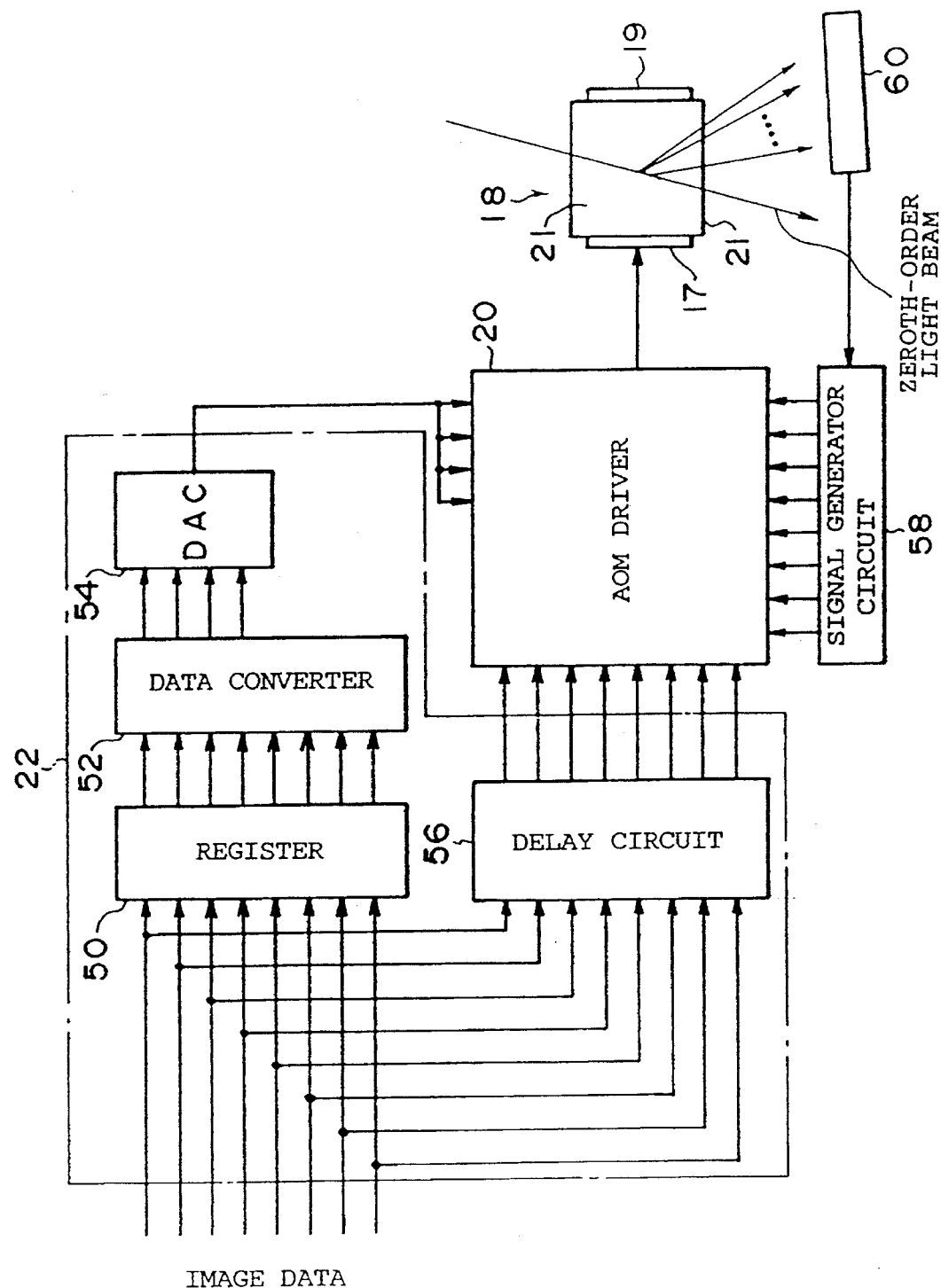
FIG. 19 is a block diagram illustrating a control circuit of an AOM used in the laser recording section.
Figure 20:
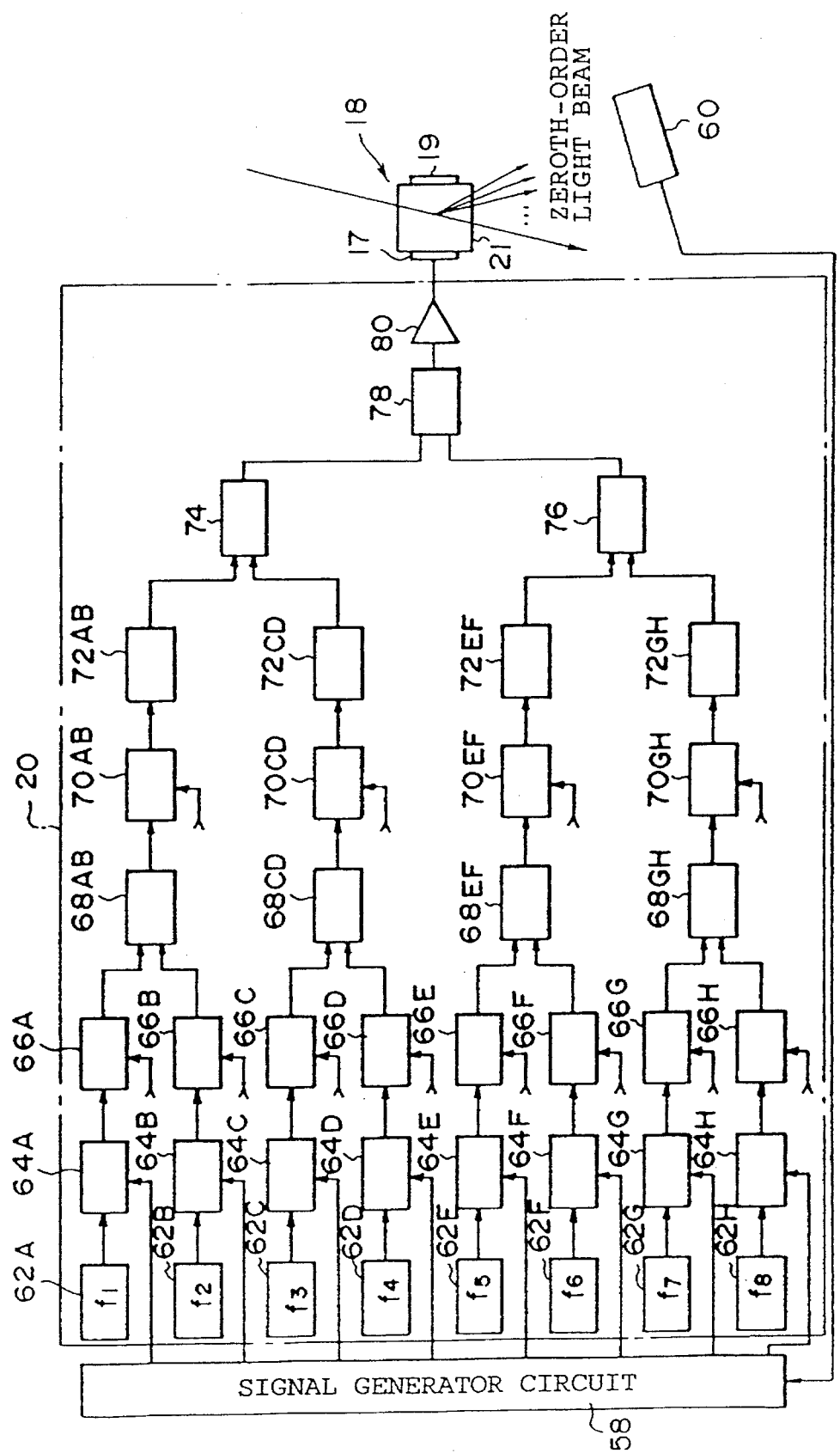
FIG. 20 is a block diagram illustrating an AOM driver for driving the AOM used in the laser recording section.

As shown in FIG. 19, the photoelectric converter 60, which is disposed at the aforementioned position on the laser-beam emergent side of the AOM 18 and outputs a large voltage corresponding to the power of the laser beam received, is electrically connected to a signal generator circuit 58 for outputting a signal for controlling the amplitude of each of the signals outputted from an oscillation circuit (FIG. 20). The AOM driver 20 is electrically connected to this signal generator circuit 58.

The control circuit 22 has a register 50 for temporarily storing the image data and a data converter 52 which is electrically connected to the register 50. The image data are given in the form of an 8-bit parallel signal. The data converter 52 outputs a 4-bit parallel signal corresponding to the number of durations (ON) of the 8-bit signal inputted from the register 50. A digital-analog converter (DAC) 54 is electrically connected to the data converter 52. The DAC 54 converts the 4-bit parallel signal outputted from the data converter 52 into an analog signal, and outputs the same to the AOM driver 20. The level of this analog signal becomes higher as the number of the durations (ON) of the signal increases. In addition, the image data are inputted to the AOM driver 20 after they are delayed for a predetermined period of time by a delay circuit 56.

As shown in FIG. 20, the AOM driver 20 comprises oscillation circuits 62A, 62B, 62C, 62D, 62E, 62F, 62G, and 62H which respectively oscillate at frequencies f1–f8, local level control circuits 64A, 64B, 64C, 64D, 64E, 64F, 64G, and 64H, and switching circuits 66A, 66B, 66C, 66D, 66E, 66F, 66G, and 66H. The local level control circuits 64A–64H are electrically connected to output terminals of the oscillation circuits 62A–62H, respectively, while the switching circuits 66A–66H are electrically connected to output terminals of the local level control circuits 64A–64H. A double balanced mixer or a pin diode attenuator can be used as the local level control circuit. The signal generator circuit 58 is electrically connected to each of level control terminals of the local level control circuits 64A–64H. In addition, the delay circuit 56 is electrically connected to each of control terminals of the switching circuits 66A–66H in such a manner that each of image data outputted from the delay circuit 56 is inputted thereto.

Respective output terminals of the switching circuits 66A and 66B are electrically connected to input terminals, respectively, of a combiner 68AB for mixing two signals together at a 1:1 ratio. Similarly, respective output terminals of the switching circuits 66C and 66D are electrically connected to input terminals, respectively, of a combiner 68CD. Furthermore, respective output terminals of the switching circuits 66E and 66F are electrically connected to input terminals, respectively, of a combiner 68EF, whereas respective output terminals of the switching circuits 66G and 66H are electrically coupled to input terminals, respectively, of a combiner 68GH.

An output terminal of the combiner 68AB is electrically connected to an amplifying circuit 72AB through a total level control circuit 70AB. Similarly, an output terminal of the combiner 68CD is electrically connected to an amplifying circuit 72CD through a total level control circuit 70CD. Furthermore, an output terminal of the combiner 68EF is electrically connected to an amplifying circuit 72EF through a total level control circuit 70EF, whereas an output terminal of the combiner 68GH is electrically coupled to an amplifying circuit 72GH through a total level control circuit 70GH. Respective output terminals of the amplifying circuits 72AB and 72CD are electrically connected to input terminals, respectively, of a combiner 74, whereas respective output terminals of the amplifying circuits 72EF and 72GH are electrically coupled to inputs, respectively, of a combiner 76. Furthermore, output terminals of the combiners 74 and 76 are electrically connected to a combiner 78, and an output terminal of the combiner 78 is electrically connected to an amplifying circuit 80 having a predetermined amplification factor. An output terminal of the amplifying circuit 80 is electrically connected to the transducer 17. Each of the total level control circuits may be constituted by a double balanced mixer or a pin diode attenuator in the same way as the local level control circuit. An output terminal of the DAC 54 in the control circuit 22 is electrically connected to each of the level control terminals of the total level control circuits.

Next, a description will be given of the development processing section 300 of the laser beam recording apparatus 10.

As shown in FIG. 2, the development processing section 300 of the laser beam recording apparatus 10 is disposed adjacent the laser recording section, and is located in such a manner as to be capable of consecutively effecting the development processing of the photosensitive material 44 which has been transported thereto from the laser recording section 200.

The photosensitive material 44 for recording an image and used for the laser beam recording apparatus 10 can be classified into silver halide films typified by a silver gelatin film, a heat-developable film (dry silver film), and the like, and non-silver halide films typified by a laser direct-recording film (LDF) and the like. In optical beam scanners such as laser beam recording apparatuses, silver halide films, such as a dry silver film, which are based on dry processing are frequently used. This development processing section 300 is so arranged as to be capable of effecting processing in correspondence with the various kinds of photosensitive material 44.

Hereafter, a description will be given of the operation of this embodiment.

First, a description will be given of the operation of the font display section 100. A control signal corresponding to the ruled-line pattern 156 is inputted to the soft form table 144. The soft form table 144 outputs a signal to the soft form memory 142 in such a manner that ruled-line data (see FIG. 6) will be outputted from the soft form memory 142. Then, the soft form memory 142 outputs to the page buffer 150 the ruled-line data (see FIG. 6) corresponding to each scanning line of the image corresponding to the ruled-line pattern 156 on the basis of that signal. Namely, the ruled-line data outputted in correspondence with the ruled-line pattern 156 are alternately written into the memory groups 150A and 150B in the page buffer 150 in the order of the scanning lines of the image. When the ruled-line data are written in all the storage areas of the page buffer 150, the image data of a predetermined ruled-line pattern to be recorded on the photosensitive material 44 are stored in the page buffer 150. These ruled-line data are formed by image data consisting of ruled-line-recorded portions and blank portions, as shown in FIG. 6. As these image data are written into the page buffer 150, all the contents of the memories stored in the page buffer 150 and used previously are rewritten by the ruled-line-recorded portions and blank portions. Thus, as the ruled lines are written into the page buffer 150, the contents of the page buffer 150 are initialized.

Meanwhile, the character codes supplied from the host computer 90 are supplied to the code converter 132 via the I/O driver 124, the VME data bus line 120, the I/O driver 122, and the sub-bus line 130. The code converter 132 converts the inputted character codes into internal codes, and outputs the internal codes to the font memory 134. The font memory 134 reads the character font of the inputted internal codes, and outputs the character font to the effect buffer 136. At the same time, the font memory 134 outputs to the page buffer control 138 the offset data which indicates the recording position of the image. In a case where the character font needs to be outputted after being converted, the effect buffer 136 outputs the character font as rotated, enlarged, or reduced data. Ordinary or converted font data are inputted to the page buffer control 138. The page buffer control 138 outputs the font data to the page buffer 150 on the basis of the offset data indicating the recording position of the image. At this time, the font data are written into the memory groups 150A and 150B of the page buffer 150 corresponding to the position of the scanning line of the image. As a result, the image data on a character is stored in the page buffer.

Then, the image data in the memory groups 150A and 150B at a designated address in the memory groups 150A and 150B of the page buffer 150 are outputted to the recording buffer 146 simultaneously in response to a control signal from the CPU 112. Here, since the image data stored alternately into the memory group 150A and the memory group 150B for each scanning line of the page buffer 150, and the memory groups 150A and the memory groups 150B can be designated by one address, the image data can be read simultaneously from the memory groups 150A and 150B of the page buffer 150.

In addition, at that time, the comic mode or the cine mode which indicates the recording direction of the image is selected. As a result, the address for designating the image data and the reading direction in the memory groups 150A and 150B of the page buffer 150 are selected. If the comic mode is selected, as the address of the page buffer 150 is 0, i.e., the image data are read sequentially from an upper left corner of the image in the X-direction, the image data are outputted in the horizontal direction of the image. Thus, the image data are outputted to the recording buffer 146 in such a manner that the image is recorded horizontally in the longitudinal direction of the film (in the direction of a in FIG. 10). On the other hand, if the cine mode is selected, as the address of the page buffer 150 is 7FH, i.e., the image data are read from an upper right corner of the image in the Y-direction. Hence, the image data are outputted to the recording buffer 146 in such a manner that the image is recorded horizontally in the transverse direction of the film (in the direction of b in FIG. 10). Thus, by changing the initial position of the image data to be read from the page buffer 150 and the reading direction, it is readily possible to output the image data whose image is rotated in such a manner as to be set in the comic mode or the cine mode.

The image data outputted from the page buffer 150 are latched by the registers 164A–164H in the recording buffer 146 (see FIG. 7). The respective image data outputted from the registers 164A–164H are inputted to the buffer 166 in the comic mode or the cine mode.

When recording is effected in the comic mode, the image data outputted from the respective registers 164A–164H of the register group 164 and having the same number of bits are inputted to the respective buffer elements 170A–170H (see FIG. 8). Accordingly, as for the image data outputted from the respective buffer elements 170A–170H, since the image data corresponding to the same row of the image are rearranged such as to be outputted from the same buffer elements, by sequentially outputting the image data from each of the buffer elements 170A–170H, it is possible to sequentially transmit the image data for simultaneously effecting the main scanning of eight lines (in the main-scanning direction) at a time when the image is recorded in the horizontal direction.

Meanwhile, when recording is effected in the cine mode, the outputs of the registers 164A–164H in the register group 164 are directly delivered to the buffer elements 172A–172H in bit-to-bit correspondence (see FIG. 9). Accordingly, as for the image data outputted from the respective buffer elements 170A–170H, since the image data in the same direction as the direction of the scanning line of the image are rearranged such as to be outputted from the same buffer elements, by sequentially outputting the image data from each of the buffer elements 170A–170H, it is possible to sequentially transmit the image data for simultaneously effecting the main scanning of eight lines (in the main-scanning direction) at a time when the image is recorded in the vertical direction.

Then, in each of the page buffers 150, 152, and 154, the processing described above is consecutively carried out as described in connection with FIG. 11, and the writing and reading of the image data with respect to the page buffers 150, 152, and 154 are effected.

In the above-described manner, the image data outputted from the page buffers are latched by the register group 164 in the recording buffer 146, and are sent to the laser recording section 200 via a corresponding one of the buffers 166A and 166B as the image data to be simultaneously subjected to the main scanning (in the direction of the scanning line) of eight lines (FIG. 5).

Next, a description will be given of the operation of the laser recording section 200. The 8-bit image data supplied from the font display section 100, are supplied to the register 50 and the delay circuit 56. The data converter 52 outputs a digital signal corresponding to the number of durations (ON) of the signal inputted from the register 50, and the DAC 54 outputs an analog signal corresponding to that digital signal. This analog signal is inputted to the respective control terminals of the total level control circuits 70AB–70GH. In addition, the image data delayed for a predetermined period of time by the delay circuit 56 are inputted to the switching circuits 66A–66H, respectively, of the AOM driver 20. After the amplitudes of the signals outputted from the oscillation circuits 62A–62H are adjusted by the local level control circuits 64A–64H, the signals are supplied to the transducer 17 of the AOM 18 via the switching circuits 66A–66H, the combiners 68AB–68GH, the total level control circuits 70AB–70GH, the amplifying circuits 72AB–72GH, the combiners 74, 76, and 78. The transducer 17 converts the inputted signals into ultrasonic signals corresponding to the frequencies and amplitudes of the inputted signals. These ultrasonic signals are propagated through the acousto-optic medium 21 and are absorbed by the sound absorbing material 19. At that time, the laser beam is divided by the power corresponding to the amplitudes of the ultrasonic signals and in directions corresponding to their frequencies by means of the acousto-optic medium 21. The multi-laser beam divided by the AOM 18 is made to scan in the main-scanning direction by the polygon mirror 28, and is made to scan in the sub-scanning direction by the galvanometer mirror 36.

FIG. 21 shows the angle of the galvanometer mirror 36 corresponding to the elapsed time. During a non-recording period prior the start of recording of a nth frame, image data of the nth frame is prepared, and the photosensitive material is fed by one frame so as to be positioned. When the recording of the nth frame is started, the image data of the nth frame is transferred until the angle of the galvanometer mirror 36 reaches a recording completion angle, so that an image of the nth frame is recorded. During a checking period in the non-recording period, the adjustment of the amplitude, i.e., the level adjustment, of each of the signals generated from the oscillation circuits 62A–62H is carried out. At this time, a laser beam emitted from the AOM 18 and transmitted through the sampling mirror 34 is made incident in the direction of the photoelectric converter 60. This level adjustment is carried out during the non-recording period prior to the start of recording of image as follows: Namely, a constant voltage is applied to each of the level control terminals of the total level control circuits 70AB–70GH so as to adjust the level of each signal outputted from each of the oscillation circuits 62A to 62H. More specifically, only the switching circuit 66A is set to an "on" state in which the signals are outputted from the oscillation circuits 62A–62H. Then, the signal outputted from the oscillation circuit 62A is supplied to the transducer 17 through the local level control circuit 64A, the switching circuit 66A, the combiner 68AB, the total level control circuit 70AB, the amplifying circuit 72AB, the combiners 74 and 78, and the amplifying circuit 80. As a consequence, the AOM 18 emits a laser beam of the power corresponding to the amplitude of the output from the local level control circuit 64A after the amplitude of the signal outputted from the oscillation circuit 62A is controlled by the local level control circuit 64A. The laser beam emitted from the AOM 18 is received by the photoelectric converter 60, which outputs an electrical signal corresponding to the power of the laser beam so received.

The signal generator circuit 58 compares a predetermined reference value and the level of a signal inputted thereto from the photoelectric converter 60. When the level of the inputted signal is greater than the reference value, the signal generator circuit 58 effects control by reducing a voltage to be applied across the control terminal of the local level control circuit 64A so as to reduce the amplitude of the inputted signal. On the other hand, when the level of the inputted signal is smaller than the reference value, the signal generator circuit 58 effects control by increasing the voltage to be applied across the control terminal of the local level control circuit 64A so as to increase the amplitude of the inputted signal. As a result, the power of one laser beam radiated emitted from the AOM 18 is adjusted to a target value. Then, the switching circuits 66B–66H are turned on in order, and the level adjustment of each of signals produced from the oscillation circuits 62B, . . . , 62H is performed in the same manner as described above. During this period of checking, the level adjustment is performed with respect to all the oscillation circuits 62A–62H. When an image is being recorded, the signal generator circuit 58 holds the value of the voltage thus adjusted.

When the image data of the nth frame is being recorded, an analog signal proportional to the number of durations (ON) of image data is supplied to each of the total level control circuits 70AB, 70CD, 70EF, and 70GH by means of the register 50, the data converter 52, and the DAC 54. Then, each of the total level control circuits 70AB, 70CD, 70EF, and 70GH controls the amplitude of each of signals outputted from the combiners 68AB–68GH in correspondence with the analog signal mentioned above. As a consequence, the power of each laser beam outputted from the AOM 18 is kept constant irrespective of the number of durations (ON) of the inputted signal, thereby making it possible to avoid the occurrence of nonuniformity of the image density, which is caused by variations in the number of durations (ON) of the image data. Incidentally, when the amplitude of the inputted signal is not controlled on the basis if the number of durations (ON) of the signal, the power of one laser beam emitted from the AOM 18 is varied according to the number of laser beams emitted simultaneously, i.e., the number of durations (ON) of the image data.

Although, in the above-described embodiment, a description has been given of the case where ruled-line and character data are used as the image data, the present invention is not limited to the same, and other data, such as image data, may be used.

Although, in the above-described embodiment, a description has been given of the case where image data are stored in different memory areas in the page buffer for each scanning line, the present invention is not limited to the same, and an arrangement may be alternatively provided such that the image data are stored in different areas or in different memories for each predetermined bit length.

Although, in the above-described embodiment, a description has been given of an example in which the present invention is applied to the optical beam scanner, the application is not restricted to the optical beam scanner. For instance, the present invention may be applied to an apparatus in which image data are stored in memories, and the image data are read from the stored memories. In addition, although in the above-described embodiment a description has been given of an example in which the present invention is specifically applied to the optical beam scanner such as a computer output microfilmer (COM), the present invention may be applied to office automation (OA) equipment, graphic arts (GA) equipment, medical equipment for such as X-ray tomography, and so on.

Although, in the above-described embodiment, a description has been given of the example of the optical beam scanner using eight laser beams, the number of the laser beams is not limited to eight.

Although, in the above-described embodiment, a description has been given of the example of the optical beam scanner using a laser beam as a light beam, the scanner may use the light of an LED as the light beam, or other light source may be used to form the light beam.

Although, in the above-described embodiment, a description has been given of the example in which the acousto-optic device is used as the optical modulator, an optical waveguide-type modulator may be used alternatively.

What is claimed is:

1. A method of recording an image by simultaneously recording a plurality of scanning lines by means of a plurality of laser beams, comprising the steps of:

(a) sequentially writing image data in units of one scanning line into a plurality of memories;

(b) simultaneously reading the image data corresponding to the plurality of scanning lines from said plurality of memories, wherein the plurality of scanning lines are to be placed adjacent each other at the time of recording, in order starting with a memory area corresponding to a leading end of each of the scanning lines toward a memory area corresponding to a terminating end thereof: and (c) emitting the laser beams on the basis of the image data which have been read, so as to record the image.

2. A method of recording an image according to claim 1, further comprising the step of: (d) storing the image data read, in units of a number identical to the number of the laser beams to be emitted, wherein in step (c) the laser beams are applied on the basis of the stored image data so as to record the image.

3. A method of recording an image according to claim 2, wherein two memories are used as said plurality of memories, wherein in step (a) the image data are written alternatively into said two memories in units of one scanning line, and in step (b) the image data of two scanning lines to be placed adjacent each other at the time of recording are simultaneously read from said two memories in order starting with the memory area corresponding to the leading end of each of the scanning lines toward the memory area corresponding to the terminating end thereof.

4. A method of recording an image according to claim 1, wherein when ruled-line data and character data are written in combined form into said plurality of memories, the ruled-line data is written in a memory area corresponding to a ruled-line portion of the image, while blank data is written in a memory area corresponding to a portion of the image other than the ruled-line portion, so as to initialize the contents of said memories.

5. A method of recording an image according to claim 1, wherein when ruled-line data and character data are written in combined form into said plurality of memories, the ruled-line data is written in a memory area corresponding to a ruled-line portion of the image, while blank data is written in a memory area corresponding to a portion of the image other than the ruled-line portion, so as to initialize the contents of said memories, and when the character data is written, data stored in a portion of each of said initialized memories where the character data is written is read, and if the data thus read is one of the ruled-line data and the character data, said one of the ruled-line data and the character data is prevented from being changed, while if the data read is the blank data, the character data is stored in each of said memories by writing in said portion a content corresponding to the character data to be written.

6. A method of recording an image according to claim 1, wherein, in steps (b) and (c), when recording is effected such that a vertical direction of the image and a transverse direction of a recording material become parallel with each other, the image is recorded by repeating a process in which the image data are read and recorded sequentially in units of a number identical to the number of the laser beams to be emitted, starting with the memory area corresponding to the leading end of each of the adjacent scanning lines whose number is identical to the number of the laser beams to be emitted, toward the memory area corresponding to the terminating end of that scanning line, and when recording is effected such that the vertical direction of the image and the transverse direction of a recording material become perpendicular to each other, the image is recorded by repeating a process in which the image data are read and recorded sequentially in units of a number identical to the number of the laser beams to be emitted, starting with a leading one of the scanning lines toward a terminating one thereof and starting with the terminating end of the scanning line toward the leading end thereof with respect to the respective scanning lines.

7. A method of recording an image according to claim 1, wherein, in steps (b) and (c), when recording is effected such that a vertical direction of the image and a transverse direction of a recording material become parallel with each other, the image is recorded by repeating a process in which the image data are read and recorded simultaneously in units of a number identical to the number of the laser beams to be emitted sequentially, starting with the memory area corresponding to the leading end of each of the adjacent scanning lines whose number is identical to the number of the laser beams to be emitted, toward the memory area corresponding to the terminating end of that scanning line, and when recording is effected such that the vertical direction of the image and the transverse direction of a recording material become perpendicular to each other, the image is recorded by repeating a process in which the image data are read sequentially from a corresponding one of said memories in data units of a number identical to the number of the laser beams to be emitted, starting with a leading one of the scanning lines toward a terminating one thereof and starting with the terminating end of the scanning line toward the leading end thereof with respect to the respective scanning lines, so as to effect recording.

8. A method of recording an image according to claim 3, wherein, in steps (b), (c), and (d), when recording is effected such that a vertical direction of the image and a transverse direction of a recording material become parallel with each other, the image is recorded by repeating a process in which the image data of two adjacent scanning lines are read simultaneously from said two memories, in order starting with the memory area corresponding to the leading end of each of the scanning lines toward the memory area corresponding to the terminating end of that scanning line, and the image data which have been read are stored and recorded in units of a number identical to the number of the laser beams to be emitted, and when recording is effected such that the vertical direction of the image and the transverse direction of a recording material become perpendicular to each other, the image is recorded by repeating a process in which the image data are read from a corresponding one of said memories in data units of a number identical to the number of the laser beams to be emitted, starting with a leading one of the scanning lines toward a terminating one thereof and starting with the terminating end of the scanning line toward the leading end thereof with respect to the respective scanning lines, so as to effect recording.

9. A method of recording an image according to claim 1, wherein said plurality of laser beams are generated by an optical modulator for dividing a incident laser beam into the plurality of laser beams each having an intensity corresponding to the amplitude of each of a plurality of signals inputted thereto and in a direction corresponding to the frequency of each of the plurality of signals.

10. An image recording apparatus comprising:

a plurality of memories having address terminals connected in common, read enable terminals connected in common, and write enable terminals provided independently, said plurality of memories being each adapted to store image data in units of one scanning line;

writing means for writing the image data sequentially into said plurality of memories in units of one scanning line by inputting a write control signal sequentially to said write enable terminals and by designating addresses sequentially;

reading means for simultaneously reading the image data corresponding to a plurality of scanning lines from said plurality of memories, wherein the plurality of scanning lines are to be placed adjacent each other at the time of recording, in order starting with a memory area corresponding to a leading end of each of the scanning lines toward a memory area corresponding to a terminating end thereof, by inputting a read control signal to said read enable terminals and by designating the addresses sequentially; and recording means for recording an image by emitting a plurality of laser beams on the basis of the image data which have been read from said plurality of memories.

11. An image recording apparatus according to claim 10, further comprising: storage means for storing the image data which have been read by said reading means, in data units of a number identical to the number of the laser beams to be emitted, wherein the laser beams are applied on the basis of the image data stored in said storage means, so as to record the image.

12. An image recording apparatus according to claim 11, wherein two memories are used as said plurality of memories, said writing means writes the image data alternatively into said two memories in units of one scanning line by outputting the write control signal alternately to said write enable terminals and by designating addresses sequentially, and said reading means simultaneously reads from said two memories the image data of two scanning lines to be placed adjacent each other at the time of recording, in order starting with the memory area corresponding to the leading end of each of the scanning lines toward the memory area corresponding to the terminating end thereof, by outputting the read control signal to said read enable terminals and by designating addresses sequentially.

13. An image recording apparatus according to claim 10, wherein when ruled-line data and character data are written, as the write control signal is inputted sequentially to said write enable terminals and addresses are designated sequentially, said writing means writes the ruled-line data in a memory area corresponding to a ruled-line portion of the image, and writes blank data in a memory area corresponding to a portion of the image other than the ruled-line portion, so as to initialize said memories, and when the character data is written, after the data stored in a portion of each of said initialized memories where the character data is written is read, and if the read data is one of the ruled-line data and the character data, said writing means prevents said one of the ruled-line data and the character data from being changed, while if the read data is the blank data, said writing means writes in said portion a content corresponding to the character data to be written.

14. An image recording apparatus according to claim 10, wherein said reading means repeats a process of simultaneously reading from said plurality of memories the image data of the plurality of scanning lines to be placed adjacent each other at the time of recording, in order starting with the memory area corresponding to the leading end of each of the scanning lines toward the memory area corresponding to the terminating end thereof, by outputting the read control signal in common to said read enable terminals and by designating addresses sequentially, wherein said reading means repeats a process in which the image data are read sequentially in units of a number identical to the number of the laser beams to be emitted, starting with a leading one of the scanning lines toward a terminating one thereof and starting with the terminating end of the scanning line toward the leading end thereof with respect to the respective scanning lines, by outputting the read control signal sequentially to said read enable terminals and by designating an address whose value is subtracted sequentially from a value of an address of the memory area corresponding to the terminating end of the scanning line, to said memory to which the read control signal has been inputted, and wherein said recording means causes the laser beams to be emitted on the basis of either one of the image data which have been read as described above, so as to record the image.

15. An image recording apparatus according to claim 12, wherein said reading means repeats a process of simultaneously reading the image data of two adjacent scanning lines in order starting with the memory area corresponding to the leading end of each of the scanning lines toward the memory area corresponding to the terminating end thereof, by outputting the read control signal to said read enable terminals and by designating addresses sequentially, wherein said reading means repeats a process in which the image data are read in units of a number identical to the number of the laser beams to be emitted, starting with a leading one of the scanning lines toward a terminating one thereof and starting with the terminating end of the scanning line toward the leading end thereof with respect to the respective scanning lines, by outputting the read control signal to said read enable terminals and by designating an address whose value is subtracted sequentially from a value of an address of the memory area corresponding to the terminating end of the scanning line, and wherein said storages means stores either one of the image data which have been read as described above, in units of a number identical to the number of the laser beams to be emitted.

16. An image recording apparatus according to claim 10, wherein said recording means includes an optical modulator for dividing a incident laser beam into the plurality of laser beams each having an intensity corresponding to the amplitude of each of a plurality of signals inputted thereto and in a direction corresponding to the frequency of each of the plurality of signals.

* * * * *